(12) United States Patent
Hori et al.

(10) Patent No.: US 10,668,559 B2
(45) Date of Patent: Jun. 2, 2020

(54) JOINING METHOD, METHOD OF MANUFACTURING LIQUID COOLING JACKET, AND LIQUID COOLING JACKET

(71) Applicant: NIPPON LIGHT METAL COMPANY, LTD., Tokyo (JP)

(72) Inventors: Hisashi Hori, Shizuoka (JP); Nobushiro Seo, Shizuoka (JP)

(73) Assignee: NIPPON LIGHT METAL COMPANY, LTD., Tokyo (JP)

( * ) Notice: Subject to any disclaimer, the term of this patent is extended or adjusted under 35 U.S.C. 154(b) by 71 days.

(21) Appl. No.: 15/755,528

(22) PCT Filed: Aug. 23, 2016

(86) PCT No.: PCT/JP2016/074495
§ 371 (c)(1),
(2) Date: Feb. 26, 2018

(87) PCT Pub. No.: WO2017/033923
PCT Pub. Date: Mar. 2, 2017

(65) Prior Publication Data
US 2018/0250767 A1  Sep. 6, 2018

(30) Foreign Application Priority Data

Aug. 26, 2015 (JP) .................. 2015-166411
Jun. 1, 2016 (JP) .................. 2016-110449
Jun. 1, 2016 (JP) .................. 2016-110453

(51) Int. Cl.
*B23K 20/12* (2006.01)
*B23K 103/18* (2006.01)
(Continued)

(52) U.S. Cl.
CPC ........ *B23K 20/1235* (2013.01); *B23K 20/124* (2013.01); *B23K 20/126* (2013.01);
(Continued)

(58) Field of Classification Search
CPC ............ B23K 20/1235; B23K 20/1255; B23K 20/124; B23K 20/126; B23K 2103/18;
(Continued)

(56) References Cited

U.S. PATENT DOCUMENTS 6,045,028 A    4/2000  Martin et al.
6,581,819 B1 *  6/2003  Aota .................... B23K 20/122
                                                    228/112.1
(Continued)

FOREIGN PATENT DOCUMENTS

JP    S52-123358 A    10/1977
JP    H11-179569 A     7/1999
(Continued)

OTHER PUBLICATIONS

Search Report for European Patent Application No. 16839270.2 (dated Apr. 4, 2019).
(Continued)

*Primary Examiner* — Kiley S Stoner
(74) *Attorney, Agent, or Firm* — Merchant & Gould P.C.

(57) ABSTRACT

A joining method includes abutting an end face of a first metal member in a plate shape having a projecting part on the end face on a rear face of a second metal member in a plate shape having a hole that is bored through the second metal member in a plate thickness direction and simultaneously inserting the projecting part into the hole. The method includes inserting a stirring pin of a rotary tool into an abutment portion of a wall of the hole and an outer peripheral surface of the projecting part from a front face side opposite to the rear face of the second metal member. The rotary tool is moved along the abutment portion to join the abutment portion by friction stirring. The abutment portion is joined together with only the stirring pin of the rotary tool being in contact with the first and second metal members.

8 Claims, 19 Drawing Sheets

(51) Int. Cl.
*B23K 103/10* (2006.01)
*B23K 103/14* (2006.01)
*B23K 101/14* (2006.01)
*B23K 103/08* (2006.01)
*B23K 103/12* (2006.01)

(52) U.S. Cl.
CPC ...... *B23K 20/1255* (2013.01); *B23K 2101/14* (2018.08); *B23K 2103/10* (2018.08); *B23K 2103/12* (2018.08); *B23K 2103/14* (2018.08); *B23K 2103/15* (2018.08); *B23K 2103/18* (2018.08)

(58) Field of Classification Search
CPC ............ B23K 2103/15; B23K 2103/14; B23K 2103/12; B23K 2101/14; B23K 2103/10; B23K 20/122–128; B23K 2101/045; B23K 2101/014
USPC ................................................ 228/112.1, 2.1
See application file for complete search history.

(56) References Cited

U.S. PATENT DOCUMENTS

| | | | | |
|---|---|---|---|---|
| 2002/0153130 A1* | 10/2002 | Okamoto | ............ | B23K 20/122 165/170 |
| 2003/0192941 A1* | 10/2003 | Ishida | ................ | B23K 20/123 228/112.1 |
| 2006/0065698 A1* | 3/2006 | Ishikawa | ............ | B23K 20/1265 228/112.1 |
| 2009/0065178 A1 | 3/2009 | Kasezawa et al. | | |
| 2009/0072007 A1* | 3/2009 | Nagano | ............. | B23K 20/1255 228/112.1 |
| 2010/0096438 A1* | 4/2010 | Sato | ................... | B23K 20/1225 228/114 |
| 2010/0101768 A1* | 4/2010 | Seo | ..................... | B23K 20/122 165/168 |
| 2011/0308059 A1* | 12/2011 | Seo | ................... | B23K 20/1265 29/428 |
| 2012/0181324 A1* | 7/2012 | Yamauchi | ............ | B23K 20/124 228/114 |
| 2012/0321904 A1* | 12/2012 | Ishibashi | ............ | B23K 20/1265 428/600 |
| 2013/0068825 A1* | 3/2013 | Rosal | ................ | B23K 20/1215 228/114 |
| 2013/0153186 A1* | 6/2013 | Gotou | ................... | H01L 23/473 165/168 |
| 2014/0166731 A1* | 6/2014 | Seo | ..................... | B23K 20/122 228/112.1 |
| 2014/0339093 A1* | 11/2014 | Lancaster-Larocque | ................... | C25D 11/022 205/121 |
| 2015/0273637 A1* | 10/2015 | Hori | ...................... | B23K 20/24 29/890.03 |
| 2015/0318519 A1* | 11/2015 | Tsutsumi | ................ | H01M 2/06 429/158 |
| 2016/0325374 A1* | 11/2016 | Hori | ...................... | B23K 20/124 |
| 2018/0214975 A1* | 8/2018 | Werz | ................... | B23K 20/1255 |
| 2018/0243858 A1* | 8/2018 | Hori | ................... | H01L 23/473 |
| 2018/0272479 A1* | 9/2018 | Hori | ........................ | B23P 15/26 |

FOREIGN PATENT DOCUMENTS

| | | | |
|---|---|---|---|
| JP | 2000-61664 A | 2/2000 | |
| JP | 2000-237881 A | 9/2000 | |
| JP | 2002-035962 A | 2/2002 | |
| JP | 2005-103617 A | 4/2005 | |
| JP | 2006-324647 A | 11/2006 | |
| JP | 3947271 B2 | 7/2007 | |
| JP | 4056587 B2 | 3/2008 | |
| JP | 2013-039613 A | 2/2013 | |
| JP | WO2014/057947 A1 * | 4/2014 | |
| JP | 2015-131323 A | 7/2015 | |
| JP | 2016-087649 A | 5/2016 | |
| WO | WO-2010067796 A1 * | 6/2010 | ........... B23K 20/122 |
| WO | 2012/026217 A1 | 3/2012 | |
| WO | 2014/103874 A1 | 7/2014 | |
| WO | 2015/107716 A1 | 7/2015 | |
| WO | 2016/072211 A1 | 5/2016 | |

OTHER PUBLICATIONS

International Search Report for PCT/JP2016/074495, dated Sep. 27, 2016.

Office Action for Japanese Patent Application No. 2017-536439, dated Jan. 9, 2018.

Office Action for Taiwanese Patent Application No. 105127023, dated Nov. 27, 2017.

Office Action for Japanese Patent Application No. 2016-100367 (dated May 8, 2018).

* cited by examiner

FIG. 11
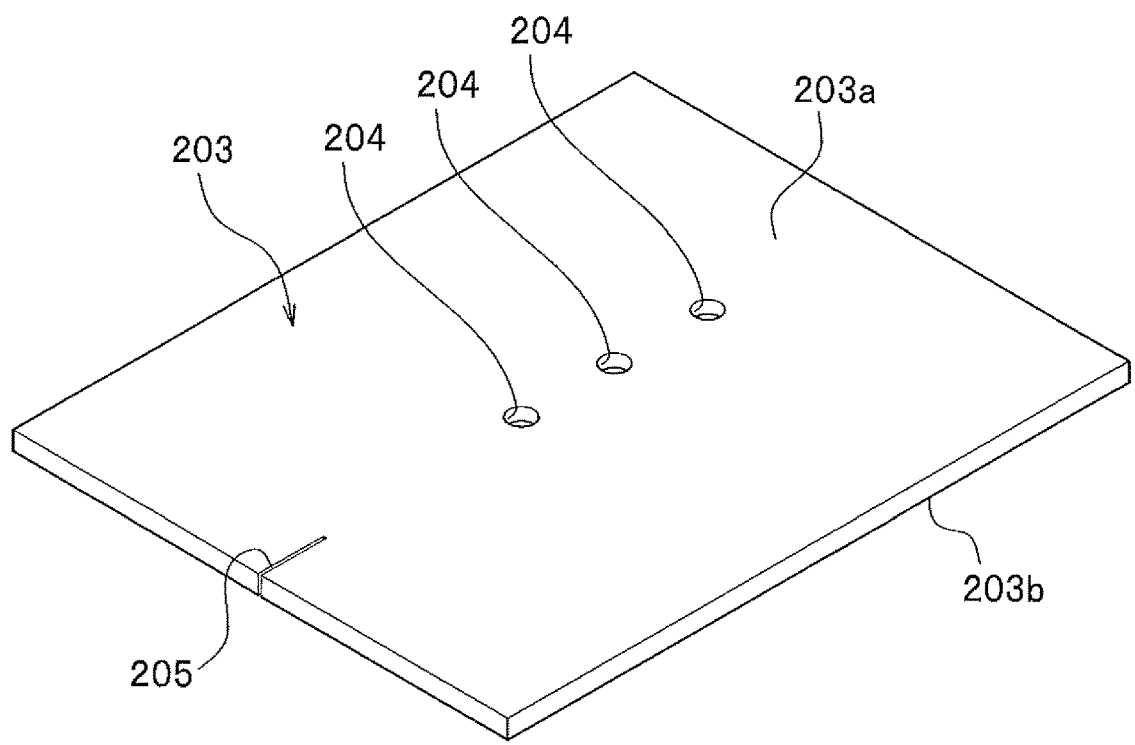
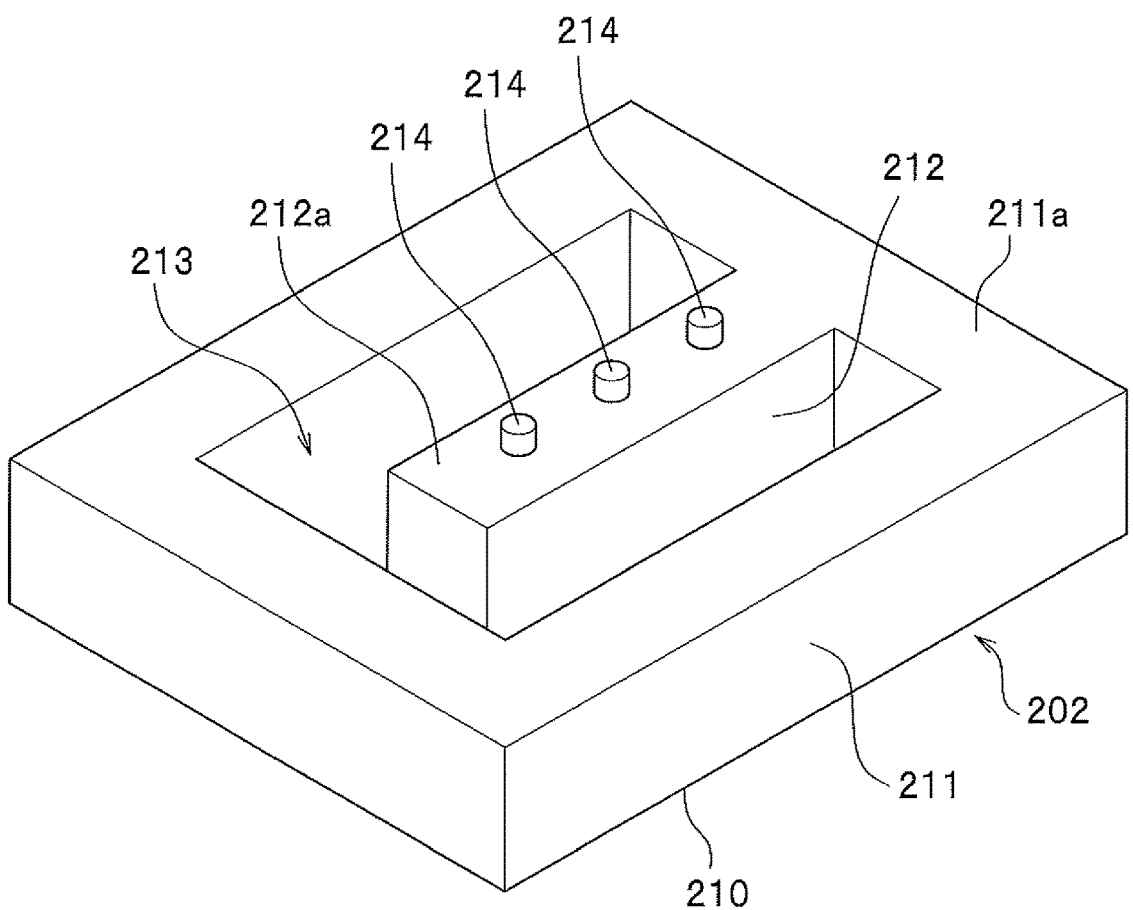

FIG. 20
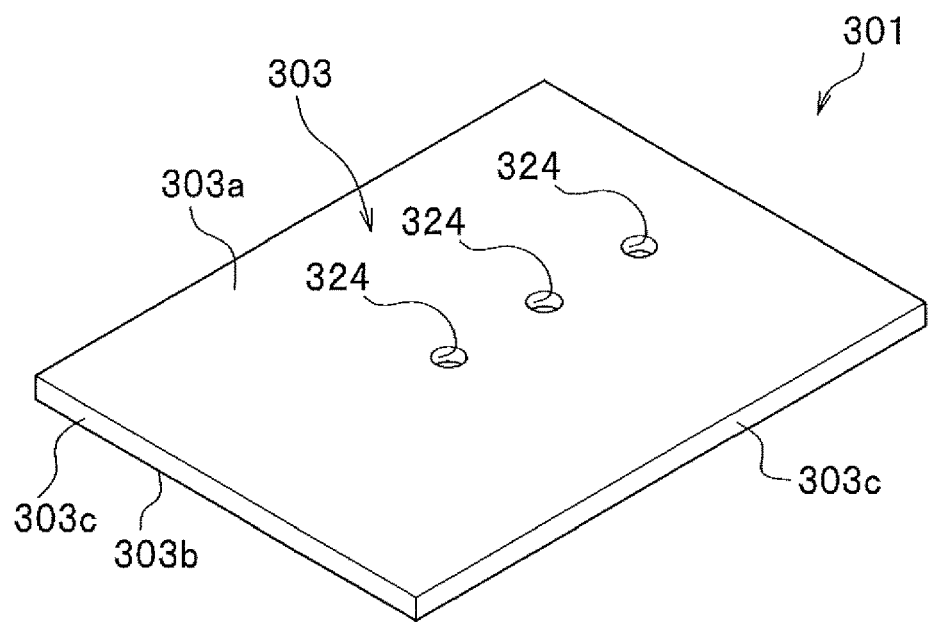
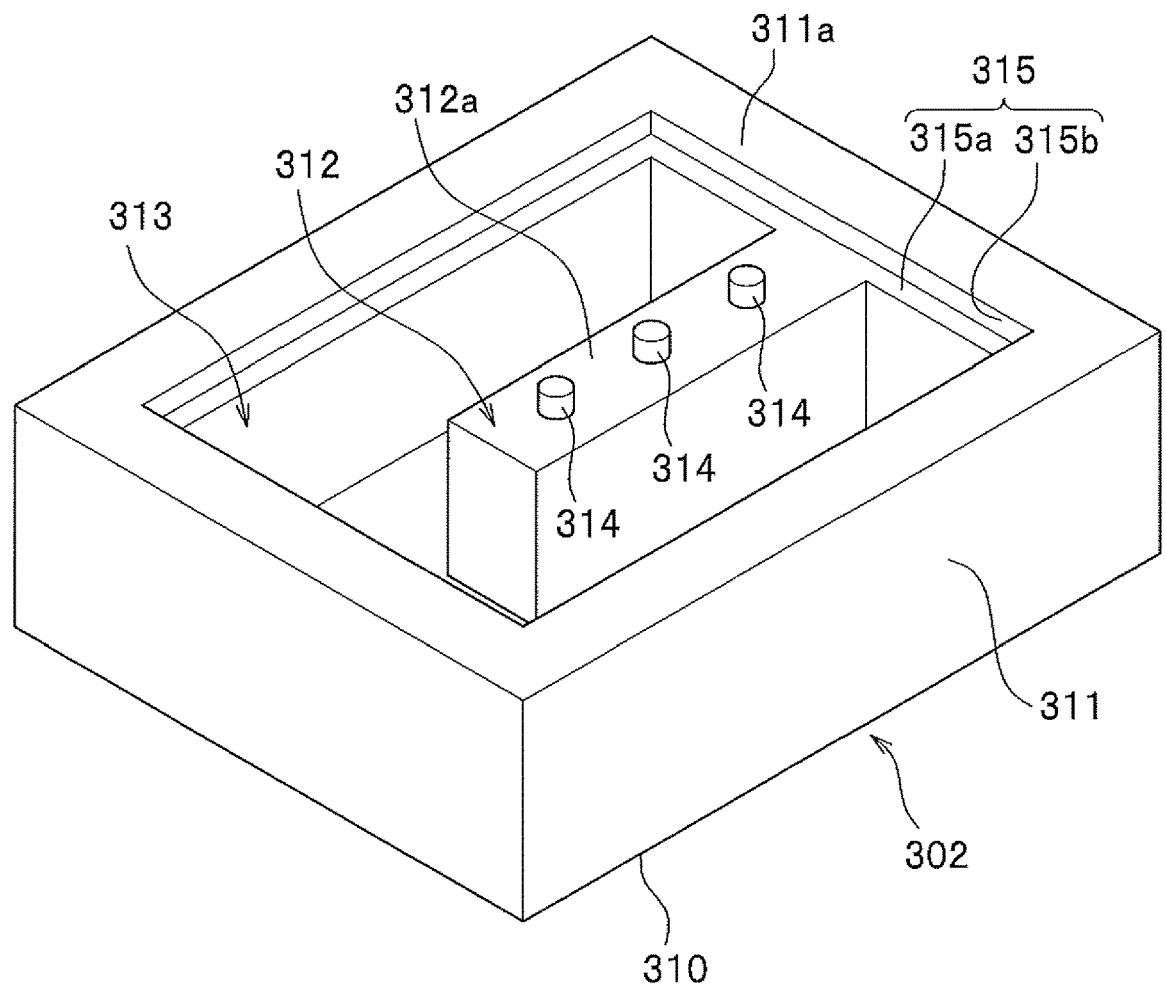

JOINING METHOD, METHOD OF MANUFACTURING LIQUID COOLING JACKET, AND LIQUID COOLING JACKET

CROSS-REFERENCE TO RELATED APPLICATION

This application is a U.S. National Stage Application under 35 U.S.C. § 371 of International Patent Application No. PCT/JP2016/074495 filed Aug. 23, 2016, which claims the benefit of priority to Japanese Patent Application No. 2015-166411, filed Aug. 26, 2015, Japanese Patent Application No. 2016-110449, filed Jun. 1, 2016, and Japanese Patent Application No. 2016-110453, filed Jun. 1, 2016, the disclosures of all of which are hereby incorporated by reference in their entireties.

TECHNICAL FIELD

The present invention relates to a joining method for friction stir joining to join metal members together, a method of manufacturing a liquid cooling jacket, and a liquid cooling jacket.

BACKGROUND ART

Patent Documents 1 and 2 disclose a technology for abutting metal members on each other to be formed into a T shape as viewed from a front side, and for performing friction stir joining on the abutment portion. In the conventional technology, an end face of a first metal member is inserted into a recess formed on a rear face of a second metal member, and subsequently a rotary tool is inserted from a front face side of the second metal member, to perform friction stir joining on the abutment portion.

As performance of electronic apparatuses such as a personal computer has advanced recently, an amount of heat generated in a CPU (heat generating body) that is mounted on the electronic apparatuses has been increasing, thereby, cooling down the CPU has been important. A heat sink in an air cooling fan type has been conventionally used to cool down the CPU, however, problems such as noises by fans and cooling limits in the air cooling system is highlighted, thus, a liquid cooling jacket is attracting attention as a next-generation cooling system.

Patent Document 3 discloses a liquid cooling jacket constituted by a jacket body provided with a support part in the center thereof and a sealing body. In a method of manufacturing the liquid cooling jacket, the sealing body is disposed on the jacket body to form an overlapped portion, and subsequently friction stir joining is performed on the overlapped portion.

PRIOR ART DOCUMENTS

Patent Documents

Patent Document 1: Japanese Patent No. 3947271
Patent Document 2: Japanese Patent No. 4056587
Patent Document 3: Japanese Unexamined Patent Application Publication No. 2015-131323

SUMMARY OF THE INVENTION

Technical Problem

In the conventional technology, the end face of the first metal member is inserted into the recess of the second metal member, so that both of the members are moved in a longitudinal direction of the first metal member. This makes it difficult to position the metal members relative to each other. Further, in the conventional technology, friction stirring is performed with a shoulder portion of the rotary tool being in contact with the front surface of the second metal member, which causes such a problem that a load exerted on a friction stirring device is large.

Furthermore, in the conventional method of manufacturing the liquid cooling jacket, there is such a problem that it is difficult to position the sealing body relative to the jacket body.

From such viewpoints, it is an object of the present invention to provide a joining method for easily performing positioning of the metal members relative to each other and allowing the load exerted on the friction stirring device to be reduced. It is another object of the present invention to provide the method of manufacturing a liquid cooling jacket in which positioning of the sealing body relative to the jacket body is easily performed, and a liquid cooling jacket.

Solution to Problem

In order to solve the forgoing problems, the present invention is characterized in that it includes an abutting step of abutting an end face of a first metal member in a plate shape having the projecting part on the end face on a rear face of a second metal member in a plate shape having the hole that is bored through the second metal member in a thickness direction and simultaneously inserting a projecting part into a hole, a friction stirring step of inserting a stirring pin of a rotary tool from a front face side opposite to the rear face of the second metal member into an abutment portion defined by a wall of the hole and an outer peripheral surface of the projecting part, and moving the rotary tool along the abutment portion to join the abutment portion by friction stirring. In the friction stirring step, the abutment portion is joined together by friction stirring with only the stirring pin of the rotary tool being in contact with the first and second metal members.

According to the method, when the projecting part is fitted in the hole, the second metal member is made immovable relative to the first metal member. In other words, both of the metal members are easily positioned by the hole and the projecting part. Further, the abutment portion is joined together by friction stirring with only the stirring pin of the rotary tool being in contact with the first and second metal members, so that a load exerted on the friction stirring device can be reduced.

Furthermore, the first metal member includes a plurality of the projecting parts, and the second metal member includes a plurality of the holes corresponding to each of the projecting parts. In the friction stirring step, each of the abutment portions is preferably joined together by friction stirring.

According to the method, the first and second metal members are joined at multiple points, so that air-tightness and joining strength of the metal members to be joined are enhanced.

The present invention provides a method of manufacturing a liquid cooling jacket in which a jacket body and a sealing body are joined together by friction stirring to form the liquid cooling jacket. The method includes a preparation step of forming the jacket body that includes a bottom part, a peripheral wall part rising from a peripheral edge of the bottom part and a support part erected on the bottom part and formed with a projecting part on an end face thereof, and forming a sealing body that is formed with the hole into which the projecting part is inserted and that seals an opening of the jacket body, a disposing step of disposing the sealing body on the jacket body to form an overlapped portion in which an end face of the peripheral wall part and a rear face of the sealing body are overlapped with each other, and to define an abutment portion on which an outer peripheral surface of the projecting part is abutted on a hole wall, and a joining step of moving a rotary tool along the overlapped portion and the abutment portion to perform friction stirring on the overlapped portion and the abutment portion respectively. The rotary tool has a stirring pin of which a length is greater than a thickness of the sealing body. The rotary tool is moved along the overlapped portion with only the stirring pin of the rotary tool being in contact with both of the peripheral wall part and the sealing body so as to join the overlapped portion by friction stirring, or the rotary tool is moved along the overlapped portion with only the stirring pin of the rotary tool being in contact with only the sealing body so as to join the overlapped portion by friction stirring. The rotary tool is moved along the abutment portion with only the stirring pin of the rotary tool being in contact with both of the outer peripheral surface of the projecting part and the hole wall so as to join the abutment portion by friction stirring.

According to the method of manufacturing, the sealing body is easily positioned relative to the jacket body by inserting the projecting part of the support part into the hole of the sealing body.

It is preferable that a joining condition is set in such a way that the burrs are formed at an outer side of the sealing body in the joining step, and the method of manufacturing includes a removing step of removing a surplus piece part of the sealing body with the burrs with a recess formed in a plasticized region as a boundary.

According to the method of manufacturing, the burrs are easily removed with the surplus piece part.

Further, the method of manufacturing preferably includes a provisional joining step of performing provisional joining on at least either of the overlapped portion and the abutment portion, prior to the joining step.

According to the method of manufacturing, it is possible to prevent gaps from being generated in the overlapped portion in the joining step.

Further, the present invention includes a jacket body that includes a bottom part, a peripheral wall part rising from a peripheral edge of the bottom part and a support part erected on the bottom part and formed with a projecting part on an end face thereof, and a sealing body that is formed with the hole into which the projecting part is inserted and that seals an opening of the jacket body. An overlapped portion in which an end face of the peripheral wall part and a rear face of the sealing body are overlapped with each other and an abutment portion on which a projecting part of the support part and the hall wall are abutted on each other, are respectively joined together by friction stirring, and an outer peripheral part of the sealing body is bordered with a plasticized region as the boundary.

According to the configuration, the sealing body is easily positioned relative to the jacket body by inserting the projecting part of the support part into the hole of the sealing body. Further, strength of the liquid cooling jacket is enhanced by joining the support part and the sealing body together.

The present invention provides a method of manufacturing a liquid cooling jacket in which a jacket body and a sealing body are joined together by friction stirring to form the liquid cooling jacket, the method includes a preparation step of forming a jacket body that includes a bottom part, a peripheral wall part rising from a peripheral edge of the bottom part, a stepped bottom surface formed at a position below by one step from an end face of the peripheral wall part, a stepped side surface rising from the stepped bottom surface, and a support part erected on the bottom surface and formed with a projecting part on an end face thereof, and forming a sealing body that is formed with a hole into which the projecting part is inserted and that seals an opening of the jacket body, a sealing body disposing step disposing of the sealing body on the jacket body to abut the stepped side surface on a side surface of the sealing body to form an first abutment portion, and to abut an outer peripheral surface of the projecting part on the hole wall to form a second abutment portion, and joining the first abutment portion and the second abutment portion by friction stirring by moving a rotary tool therearound. The rotary tool is moved along the first abutment portion with only a stirring pin of the rotary tool being in contact with both of the peripheral wall part and the sealing body so as to join the first abutment portion by friction stirring. The rotary tool is moved along the second abutment portion with only the stirring pin of the rotary tool being in contact with both of the outer peripheral surface of the projecting part and the hole wall so as to join the second abutment portion by friction stirring.

According to the method of manufacturing, the sealing body is easily positioned relative to the jacket body by inserting the projecting part of the support part into the hole wall of the sealing body.

Further, the method of manufacturing preferably includes an auxiliary member disposing step of disposing an auxiliary member along the first abutment portion on which the first abutment portion is joined together by friction stirring with only the stirring pin being in contact with the peripheral wall part, the sealing body and the auxiliary member in the joining step.

According to the method of manufacturing, the auxiliary member is joined together by friction stirring in addition to the peripheral wall part and the sealing body, it is possible to prevent the shortage of metal in the joint.

Further, it is preferable a joining condition is set in such a way that the burrs are formed on the auxiliary member in the joining step, and the method of manufacturing includes a removing step of removing the auxiliary member on which the burrs are formed.

According to the method of manufacturing, the burrs are easily removed.

It is preferable that the joining step includes friction stir joining with the rotary tool of which a central axis for rotation being inclined toward an inside of the jacket body.

According to the method of manufacturing, the rotary tool is easily inserted.

Further, the method preferably includes a provisional joining step of performing provisional joining on at least either of the first abutment portion and the second abutment portion, prior to the joining step.

According to the method of manufacturing, it is possible to prevent gaps from being generated in the first abutment portion in the joining step.

Further, the present invention is characterized in that it has a jacket body that includes a bottom part, a peripheral wall part rising from a peripheral edge of the bottom part, a stepped bottom surface formed at a position below by one step from an end face of the peripheral wall part, a stepped side surface rising from the stepped bottom surface, and a support part erected on the bottom part and formed with a projecting part on an end face thereof, and a sealing body that is formed with a hole into which the projecting part is inserted and that seals an opening of the jacket body. A first abutment portion on which a stepped side surface and a side surface of the sealing body are abutted on each other and a second abutment portion on which an outer peripheral surface of the projecting part is abutted on the hole wall, are joined together by friction stirring, respectively.

According to the configuration, the projecting part of the support part is inserted into the hole of the sealing body, so that the sealing body is easily positioned. Further, the strength of the liquid cooling jacket is enhanced by joining the support part and the sealing body together.

Advantageous Effects of Invention

The joining method according to the present invention makes it easy to position metal members relative to each other, and to allow a load exerted on a friction stirring device to be reduced. Further, with the method of manufacturing a liquid cooling jacket and a liquid cooling jacket according to the present invention, a sealing body is easily positioned relative to a jacket body.

BRIEF DESCRIPTION OF DRAWINGS

FIG. 11 is a perspective view showing a preparation step according to the third embodiment.

FIG. 20 is a perspective view showing a preparation step according to the fourth embodiment.

DESCRIPTION OF EMBODIMENTS

First Embodiment

Figure 1:
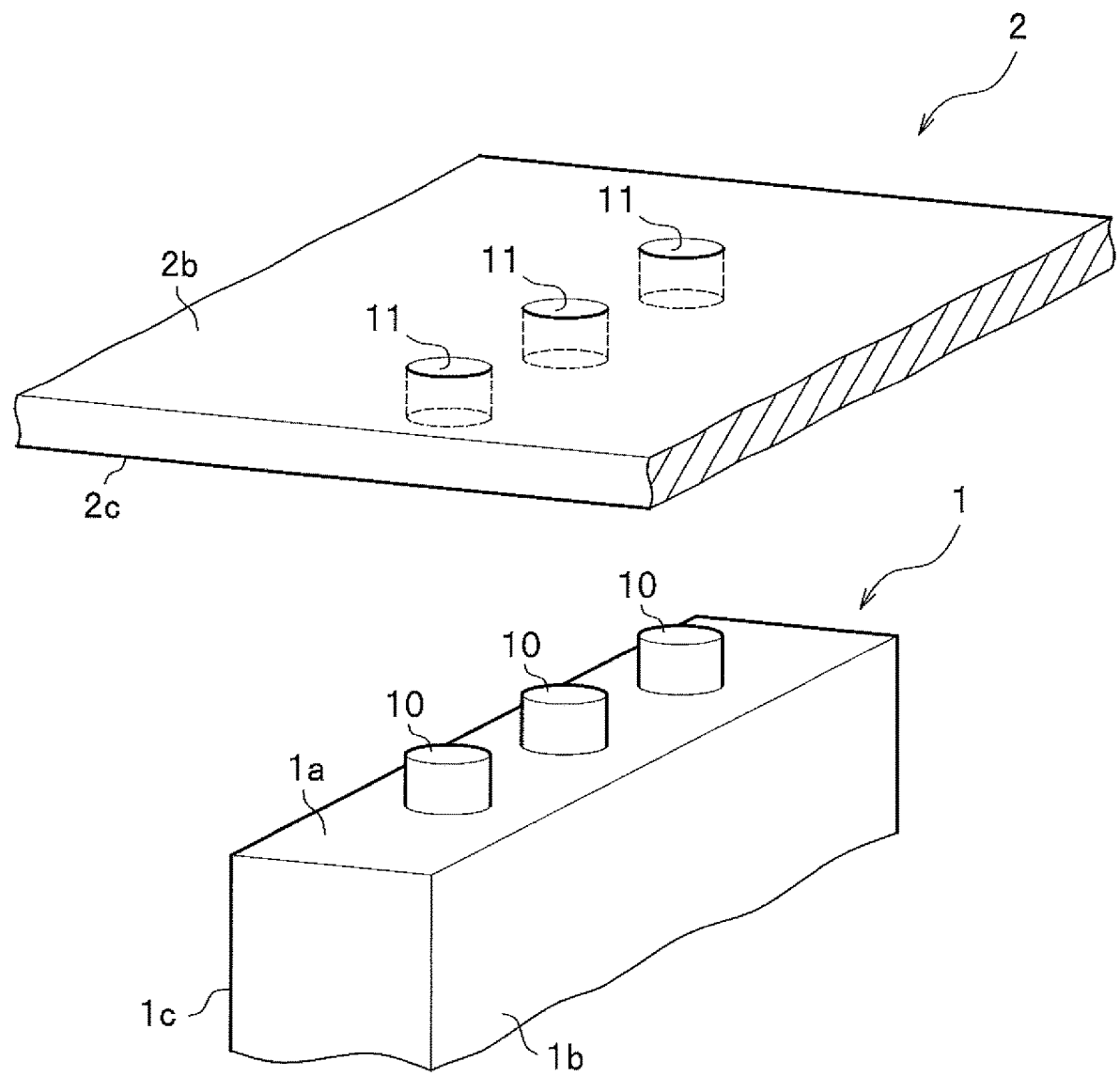
FIG. 1 is a perspective view showing a first metal member and a second metal member for a joining method according to a first embodiment of the present invention.

A joining method according to a first embodiment of the present invention will be described in detail with reference to the drawings. As shown in FIG. 1, in a joining method according to the present embodiment, a first metal member 1 and a second metal member 2 are abutted on each other to have the abutment portion formed into a T-shape as viewed from the front to be joined together by friction stirring. The joining method according to the present embodiment includes an abutting step and a friction stirring step. Note that, a "front surface" in the description means a surface opposite to a "rear face".

The first metal member 1 and the second metal member 2 each have a plate shape. Materials for the first metal member 1 and the second metal member 2 are suitably selected from among metals such as aluminum, aluminum alloy, copper, copper alloy, titanium, titanium alloy, magnesium, magnesium alloy or the like, which can be stirred by friction.

An end face 1a of the first metal member has a plurality of projecting parts 10 (three in the present embodiment) formed thereon. The number of the projecting parts 10 is not limited. The number of single projecting parts 10 may be single. The shape of the projecting part 10 is not particularly limited, and in the present embodiment, it has a columnar shape. The height of the projecting part 10 is equal to the thickness of the second metal member 2.

The second metal member 2 has holes 11 bored passing from a front surface 2b through a rear face 2c formed therein. Each of the holes 11 has a columnar hollow section, and is formed at a position corresponding to a position of each of the projecting parts 10. The hole 11 has a size such that the projecting part 10 is fitted therein with no substantial gap.

Figure 2:
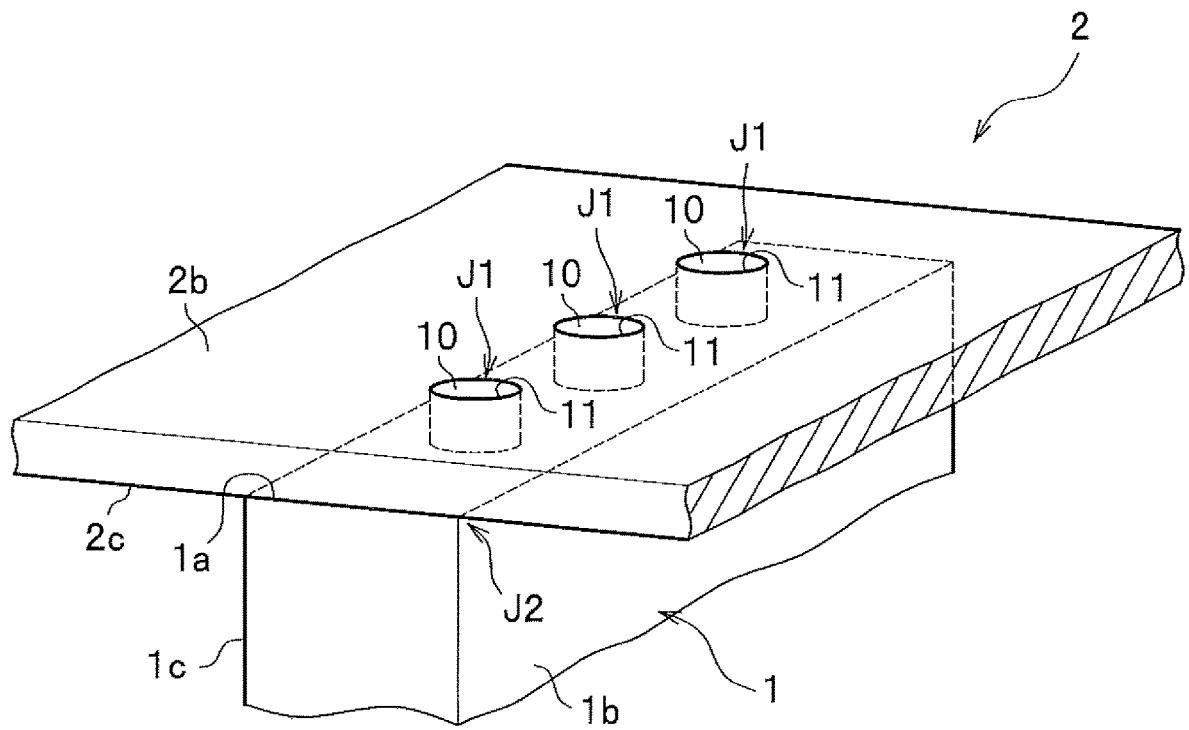
FIG. 2 is a perspective view showing an abutting step of a joining method according to the first embodiment.
Figure 3:
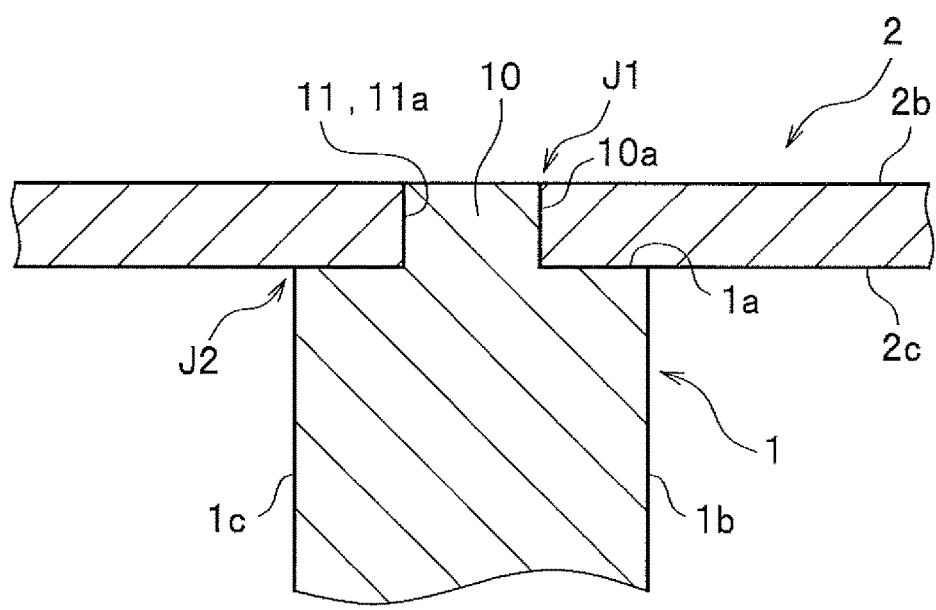
FIG. 3 is a cross-sectional view showing the abutting step of the joining method according to the first embodiment.

As shown in FIG. 2 and FIG. 3, the abutting step includes abutting the end face 1a of the first metal member 1 on the rear face 2c of the second metal member 2 and simultaneously inserting each of the projecting parts 10 into each of the holes 11. As shown in FIG. 3, a peripheral side face 10a of each of the projecting parts 10 and a wall 11a of each of the holes 11 are abutted on each other to define abutment portions J1. Further, the end face 1a of the first metal member and the rear face 2c of the second metal member are abutted on each other to define abutment portions J2.

Figure 4:
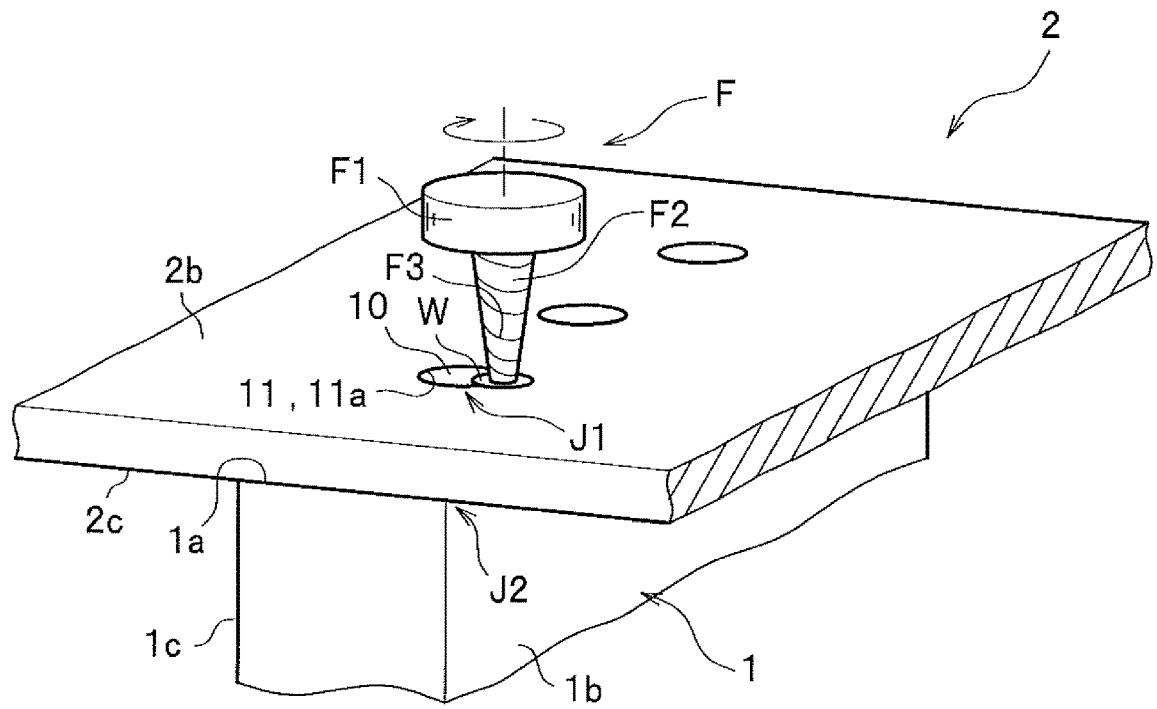
FIG. 4 is a perspective view showing a friction stirring step of the joining method according to the first embodiment.
Figure 5:
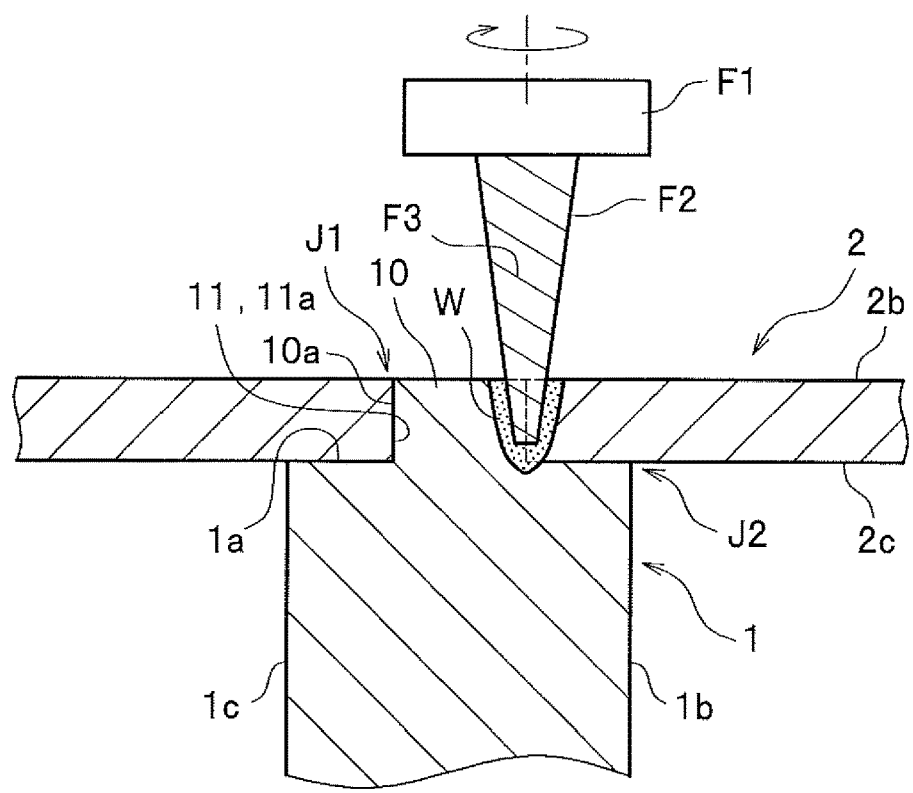
FIG. 5 is a cross-sectional view showing the friction stirring step of the joining method according to the first embodiment.
Figure 6:
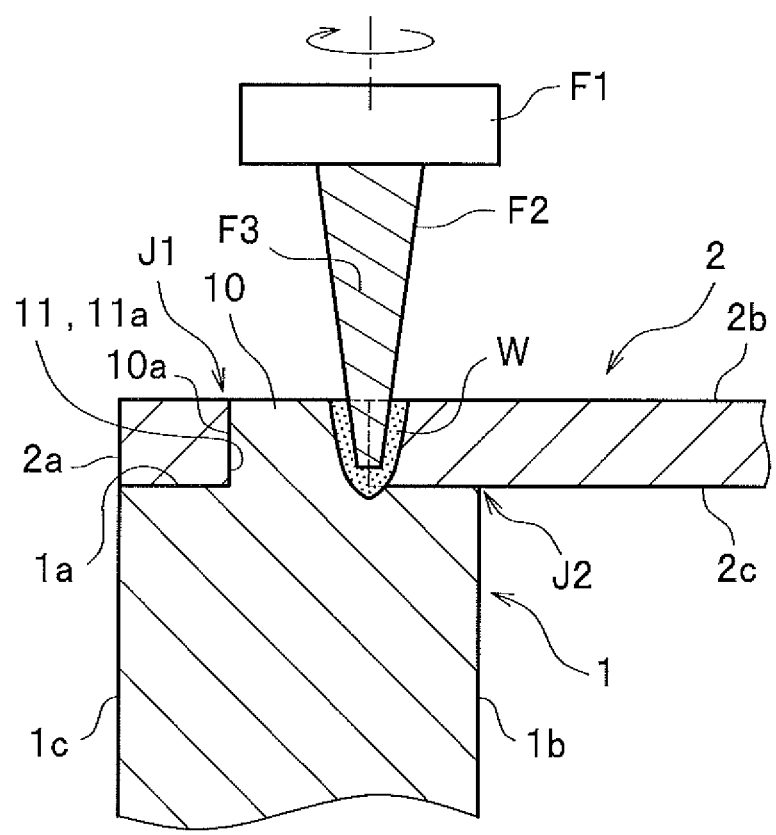
FIG. 6 is a cross-sectional view showing a variation of the first embodiment.

As shown in FIG. 4 and FIG. 5, the friction stirring step includes inserting a rotating rotary tool F from a front surface 2b of the second metal member 2 to perform friction stir joining on the abutment portion 1 exposed to the front surface 2b of the second metal member. The rotary tool F is composed of a connection portion F1 and a stirring pin F2. The connection portion F1 is a portion that is attached to a friction stirring device not shown, and has a columnar shape.

The stirring pin F2 is suspended from the connection portion F1, and is coaxial with the connection portion F1. The stirring pin F2 tapers as the stirring pin is separated from the connection portion F1. The stirring pin F2 has a spiral groove F3 engraved on the outer circumferential surface thereof. In the present embodiment, in order to rotate the rotary tool F clockwise, the spiral groove F3 is formed counterclockwise from a base end to a distal end of the stirring pin F2. In other words, when the spiral groove F3 is traced from the base end toward the distal end, the spiral groove F3 is formed counterclockwise as viewed from above.

Note that, in a case where the rotary tool F is rotated counterclockwise, the spiral groove F3 is preferably formed clockwise from the base end toward the distal end of the stirring pin F2. In other words, when the spiral groove F3 in this case is traced from the base end toward the distal end, the spiral groove F3 is formed clockwise as viewed from above. The spiral groove F3 is formed in such a way as to allow the metal which is plasticized and fluidized in friction stirring, to flow through the spiral groove F3 toward the distal end of the stirring pin F2. This makes it possible to reduce the amount of metal to be spilled out of metal members to be joined (the first metal member 1 and the second metal member 2).

As shown in FIG. 4 and FIG. 5, in the friction stirring step, the stirring pin F2 being rotated clockwise is inserted into each of the abutment portions J1 from the front surface 2b of the second metal member 2. In the friction stirring step, the rotary tool F is moved along one of the abutment portions J1 with the stirring pin F2 being in contact with the first metal member 1 and the second metal member 2. Each of plasticized regions W is formed on a path on which the rotary tool F was moved. An insertion depth of the stirring pin F2 may be set as appropriate, and in the present embodiment, is set to allow each of the plasticized regions W to reach each of the abutment portions J2. In the friction stirring step, a starting end and a terminal end of each the plasticized regions W are preferably set to be overlapped with each other. This can enhance air-tightness of the joint.

In the friction stirring step, friction stir joining is also performed on each of the other abutment portions J1 which include the projecting parts 10 and the holes 11. Note that, after the friction stirring step is finished, it is preferable to perform a burring step of removing burrs formed on the front surface 2b of the second metal member 2. This allows the front surface 2b of the second metal member 2 to be cleanly finished.

According to the joining method according to the present embodiment described above, when the projecting part 10 is fitted in the hole 11, the second metal member 2 is immovably fixed relative to the first metal member 1. In other words, it is possible to position both of the metal members by the projecting parts 10 and the holes 11. Further, since each of the abutment portions J1 is joined together by friction stirring with only the stirring pin F2 of the rotary tool F being in contact with the first metal member 1 and the second metal member 2, a load exerted on the friction stirring device can be reduced.

Further, as in the present embodiment, a plurality of the projecting parts 10 and the holes 11 are formed, and friction stir joining is performed on each of the abutment portions J1, so that air-tightness and joining strength of the metal members to be joined can be enhanced. Furthermore, in the friction stirring step according to the present embodiment, only the stirring pin F2 of the rotary tool F is inserted into the first metal member 1 and the second metal member 2, so that a width of each of the plasticized regions W can be made narrow. This prevents plasticized and fluidized material from escaping to inner corners defined by the first metal member 1 and the second metal member 2. Additionally, even if the first metal member 1 is made thinner, the plasticized and fluidized material hardly escapes to the inner corners, resulting in the enhancement of design flexibility.

Note that, in order to prevent the second metal member 2 from being floated relative to the first metal member 1 during friction stirring step, each of the projecting parts 10 may be pressed into each of the holes 10. Further, when the plurality of the abutment portions J1 are joined together by friction stirring, each of the abutment portions J1 may be joined in succession by friction stirring with the rotary tool F being in contact with the first metal member 1 and the second metal member 2 to join the abutment portions J2 between the adjacent projecting parts 10 and 10 by friction stirring.

[Variation]

Next, a description will be given of a variation of the joining method according to the first embodiment. The variation of the first embodiment is different from the first embodiment in that the abutting step is performed in a state that the first metal member 1 and the second metal member 2 are abutted on each other to have the abutment portion formed into a L-shape. The joining method according to the variation of the first embodiment includes the abutting step and the friction stirring step.

In the abutting step, the end face 1a of the first metal member 1 is abutted on the rear face 2c of the second metal member 2 to define the abutment portions J2, while each of the projecting parts 10 are inserted into each of the holes 11 respectively to define the abutment portions J1. Further, in the abutting step, a side surface 1c of the first metal member 1 is flush with an end face 2a of the second member.

The friction stirring according to the present variation is equivalent to that in the first embodiment, and the description thereof is omitted. The variation can also produce the same advantageous effects as those in the first embodiment.

Second Embodiment

Figure 7:
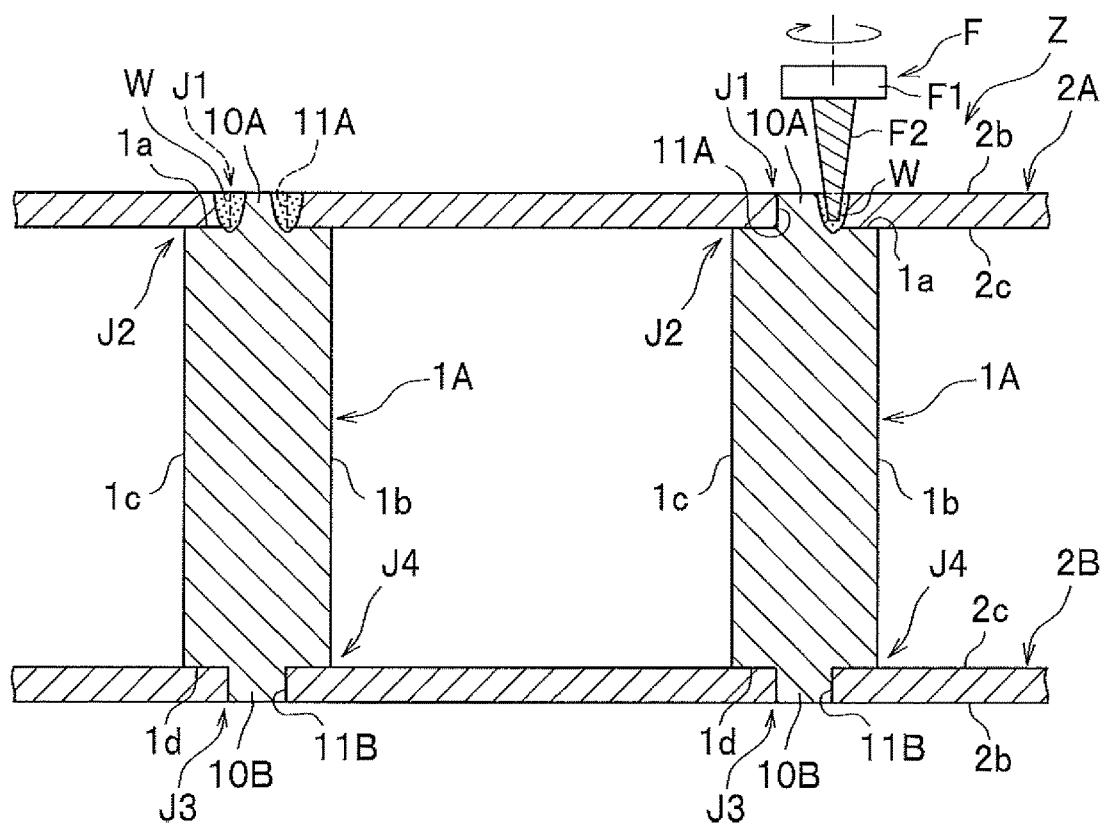
FIG. 7 is a cross-sectional view showing a first friction stirring step of a joining method according to a second embodiment of the present invention
Figure 8:
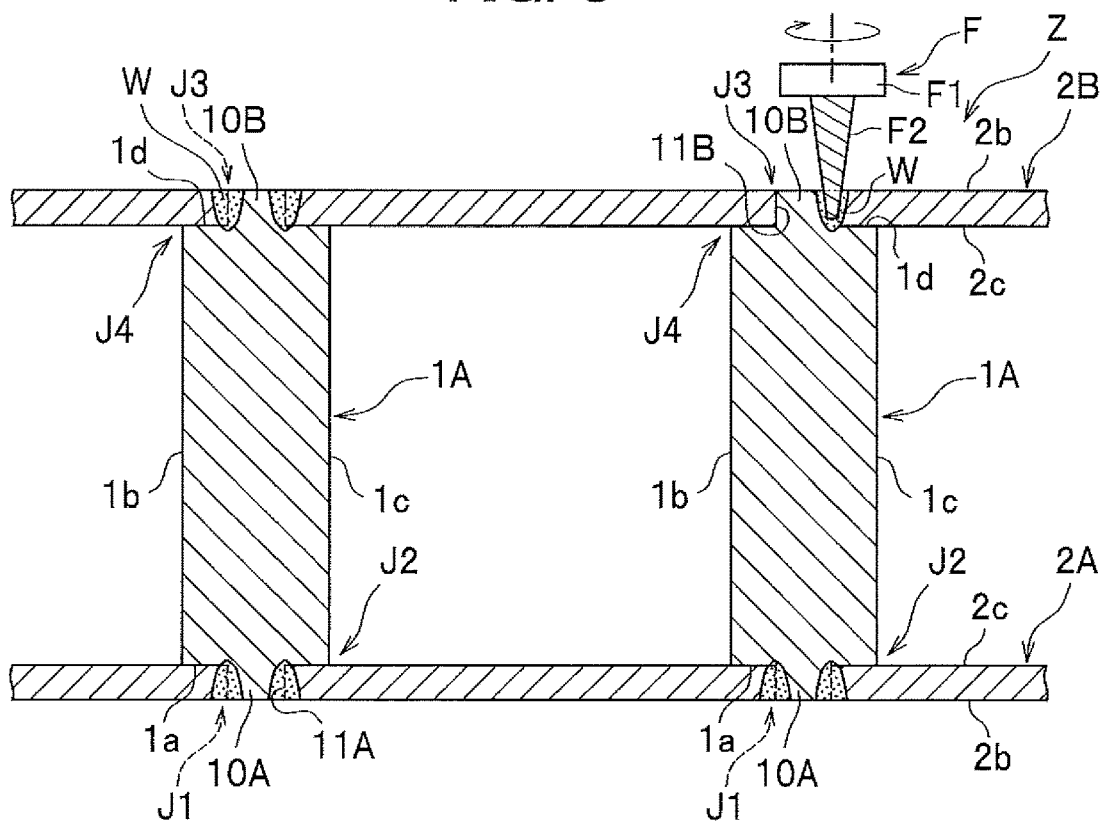
FIG. 8 is a cross-sectional view showing a second friction stirring step of the joining method according to the second embodiment.

Next, a description will be given of a joining method according to a second embodiment. As shown in FIG. 7 and FIG. 8, the joining method according to the second embodiment includes forming a structure Z having a hollow section defined by a plurality of the first metal members 1A and a pair of the second metal members 2A and 2B. The joining method according to the present embodiment includes an abutting step, a first friction stirring step, and a second friction stirring step.

Each of the first metal members 1A has a plate shape, and has projecting parts 10A formed on the one end face 1a and projecting parts 10B formed on the other end face 1d. Each of the first metal members 1A has a plurality of the projecting parts 10A and the projecting parts 10B formed in the longitudinal direction thereof. The second metal member 2B has a plurality of holes 11A corresponding to each of the projecting parts 10A respectively. The second metal member 2B has a plurality of holes 11B corresponding to each of the projecting parts 10B respectively.

In the abutting step, each of the projecting parts 10A of the first metal members 1A is inserted into each of the holes 11A of the second metal member 2A to define the abutment portions J1. Further, in the abutting step, the rear face 2c of the second metal member 2A is abutted on the one end face 1a of the first metal member 1A to define the abutment portions J2. Furthermore, each of the projecting parts 10B of the first metal members 1A is inserted into each of the holes 11B of the second metal members 2B to define abutment portions J3. Additionally, in the abutting step, the rear face 2c of the second metal member 2B is abutted on the other end faces 1d of the first metal member 1A to define abutment portions J4.

In the first friction stirring step, friction stir joining is performed on the abutment portions J1. As shown in FIG. 7, in the first friction stirring step, friction stir joining is performed on each of the abutment portions J1 in the same manner as the friction stirring step of the first embodiment. After friction stir joining is performed on each of the abutment portions J1, the metal members to be joined (the first metal members 1A, the second metal members 2A and 2B) are turned upside down, and then the second friction stirring step is performed.

In the second friction stirring step, friction stir joining is performed on the abutment portions J3. As shown in FIG. 8, in the second friction stirring, friction stir joining is performed on each of the abutment portions J3 in the same manner as the friction stirring step of the first embodiment. Consequently, the structure Z having the hollow section is formed.

The joining method according to the second embodiment as described above can also produce the same advantageous effects as those in the first embodiment. Further, with the joining method according to the second embodiment, it is possible to form easily the structure Z that is provided with a plurality of the hollow sections and has high air-tightness.

Third Embodiment

Figure 9:
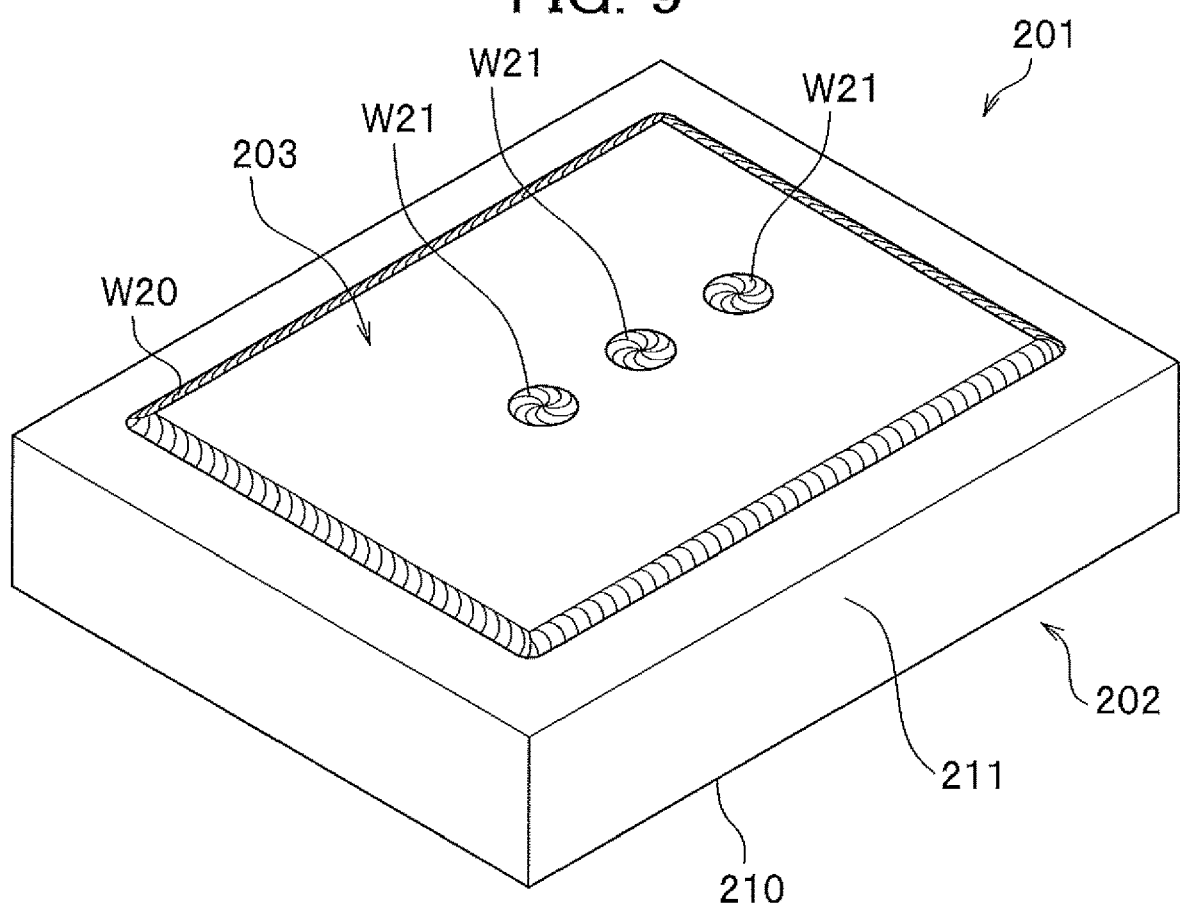
FIG. 9 is a perspective view showing a liquid cooling jacket according to a third embodiment of the present invention.

A detailed description will be given of a liquid cooling jacket 201 and a method of manufacturing a liquid cooling jacket according to a third embodiment of the present invention with reference to the drawings. As shown in FIG. 9, the liquid cooling jacket 201 according to the present embodiment is composed of a jacket body 202 and a sealing body 203. The liquid cooling jacket 201 is an apparatus for circulating fluid therein to exchange heat with a heat-generating element (not shown) installed on the liquid cooling jacket 201.

Figure 10:
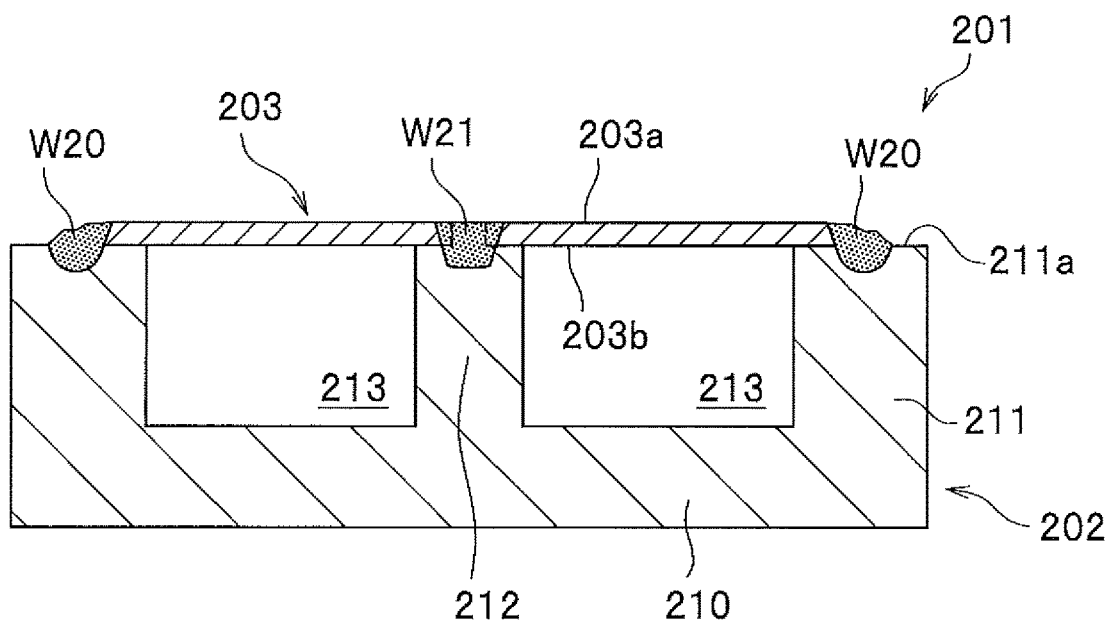
FIG. 10 is a cross-sectional view showing the liquid cooling jacket according to the third embodiment.

As shown in FIG. 10, the jacket body 202 is configured to include a bottom part 210, a peripheral wall part 211, and a support part 212. The jacket body 202 has a box-shaped body of which the upper part is open. The jacket body 202 is formed of aluminum alloy in the present embodiment. A material for the jacket body 202 is suitably selected from among metals, for example, aluminum, aluminum alloy, copper, copper alloy, titanium, titanium alloy, magnesium, magnesium alloy or the like, which can be stirred by friction. As shown in FIG. 11, the bottom part 210 has the form of a rectangular plate in planar view. The peripheral wall part 211 is erected on a peripheral edge of the bottom part 210, and has the form of a rectangular frame in planar view. The bottom part 210 and the peripheral wall part 211 define recesses 213.

The support part 212 is a plate member erected on the bottom part 210. The support part 212 is formed continuously to one wall part of the peripheral wall part 211, and is separated from the other wall part facing the one wall part. An end face 212a of the support part 212 and an end face 211a of the peripheral wall part 211 are flush with each other. The end face 212a of the support part 212 has projecting parts 214 formed thereon. The height of each of the projecting parts 214 is almost equal to the thickness of the sealing body 203. The shape of the projecting parts 214 is not particularly limited, and in the present embodiment, has a columnar shape. The number of the projecting parts 214 is not particularly limited. In the present embodiment, three projecting parts 214 are formed.

The sealing body 203 is a plate member that seals openings of the jacket body 202 as shown in FIG. 9 and FIG. 10. The sealing body 203 has the form of a rectangular in planar view. The sealing body 203 is joined to the peripheral wall part 211 by friction stirring. The peripheral edge of the sealing body 203 is bordered with a plasticized region W20. Further, the support part 212 is joined together by friction stirring at each of plasticized regions W21 in the center part of the sealing body 203.

Next, a description will be given of a method of manufacturing a liquid cooling jacket according to the third embodiment. The method of manufacturing the liquid cooling jacket includes a preparation step, a disposing step, a joining step and a removing step.

In the preparation step, the jacket body 202 and the sealing body 203 are prepared as shown in FIG. 11. The method of manufacturing the jacket body 202 is not particularly limited, however, is formed, for example, by die casting or the like. The sealing body 203 has a slit 205 extending from the outer edge toward the center part formed thereon.

Figure 12:
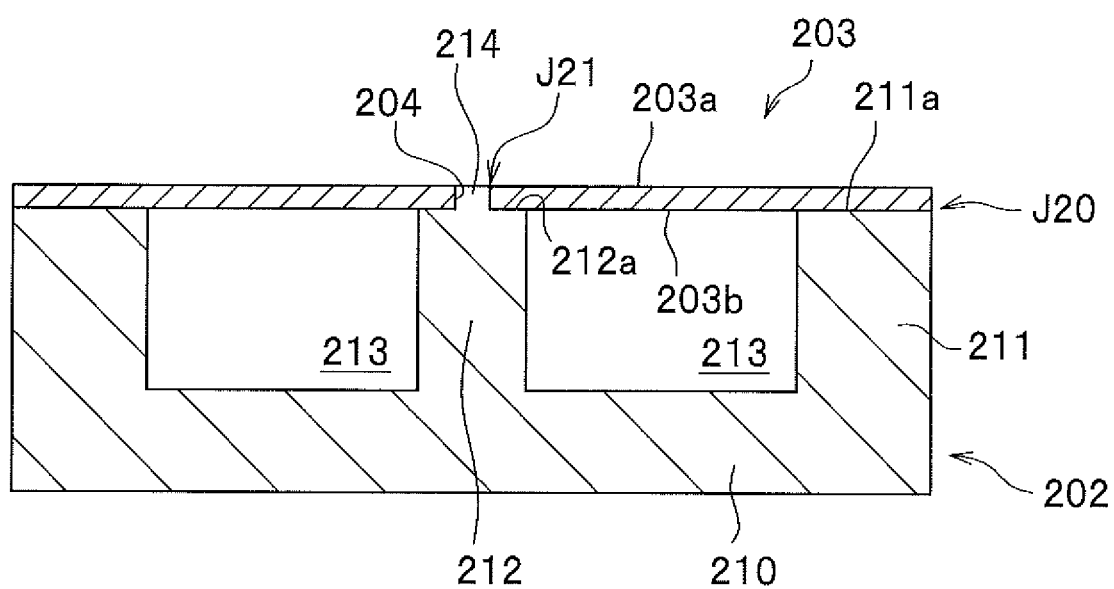
FIG. 12 is a cross-sectional view showing a disposing step according to the third embodiment.

In the disposing step, the sealing body 203 is disposed on the jacket body 202 to define an overlapped portion J20 and an abutment portion J21. In the disposing step as shown in FIG. 12, the sealing body 203 is disposed on an end face 211a of the peripheral wall part 211 so that the end face 211a of the peripheral wall part 211 and a rear face 203b of the sealing body 203 are overlapped with each other. Thereby, the overlapped portion J20 is defined along a peripheral edge of the sealing body 203. Further, each of the projecting parts 214 are inserted into each of the holes 204 to define the abutment portion J21 in which the outer peripheral surface of each of the projecting parts 214 is abutted on the wall of each of the holes 204. Furthermore, the jacket body 202 and the sealing body 203 are immovably fixed on a table with a fixing tool such as a clamp.

The joining step as shown in FIG. 13 to FIG. 16 includes the first joining step and the second joining step by a joining rotary tool (rotary tool) F. Either of the first joining step or the second joining step may be performed first. In the present embodiment, the second joining step is performed first.

Figure 13:
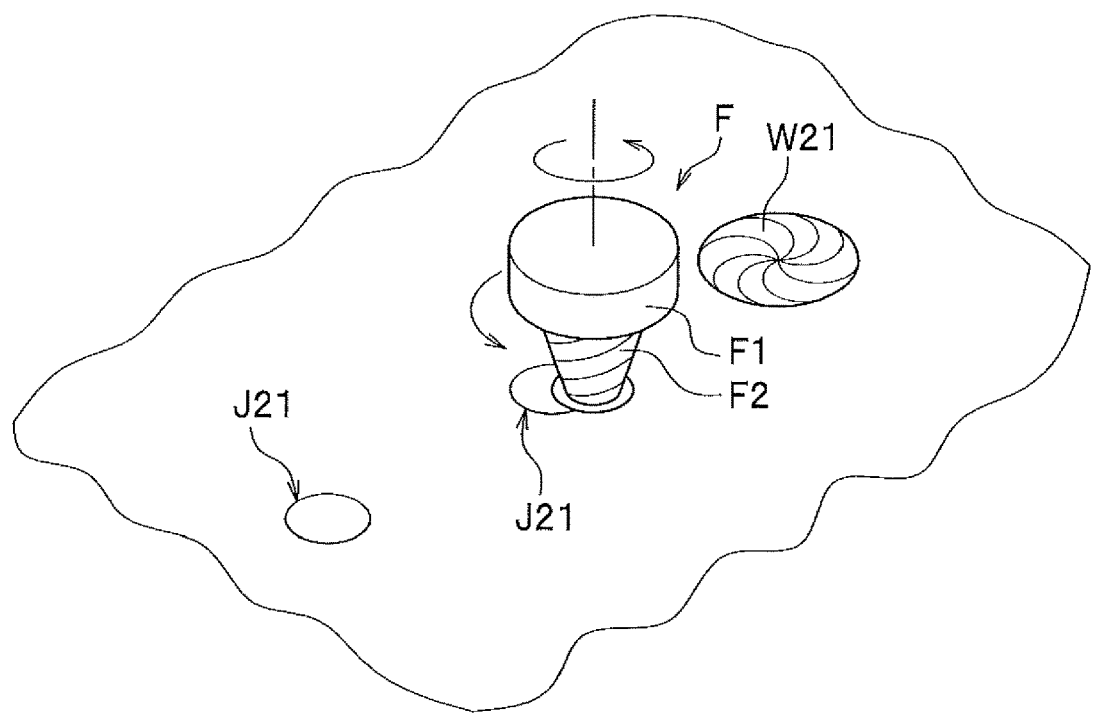
FIG. 13 is a perspective view showing a second joining step according to the third embodiment.
Figure 14:
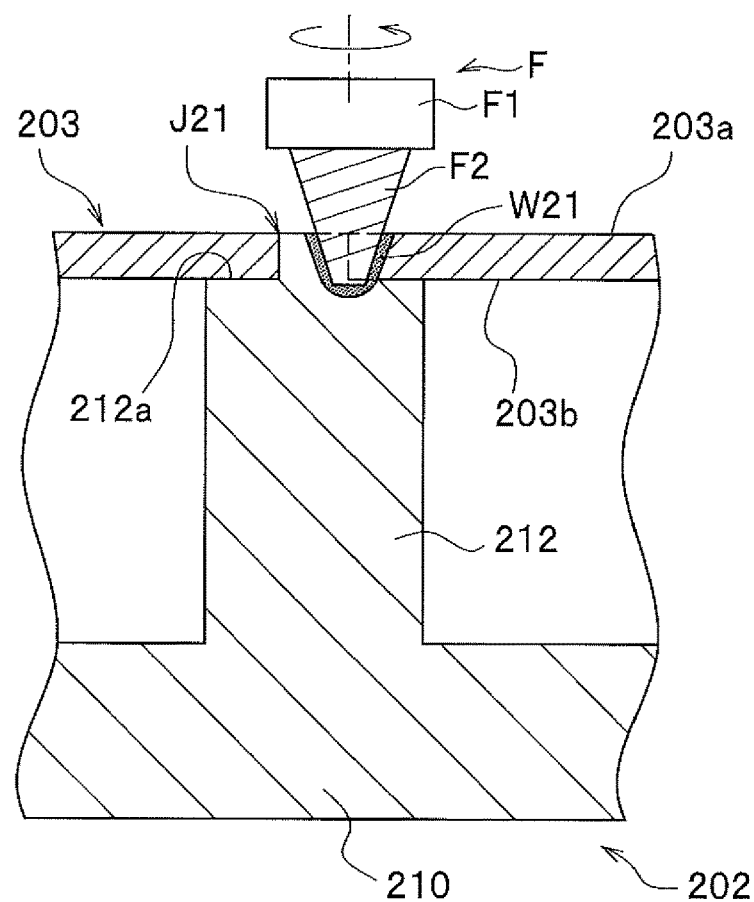
FIG. 14 is a cross-sectional view showing the second joining step according to the third embodiment.

In the second joining step as shown in FIG. 13 and FIG. 14, the abutment portion J21 is joined together by friction stirring with the joining rotary tool F. The joining rotary tool F is composed of a connection portion F1 and a stirring pin F2. The stirring pin F2 has a spiral groove engraved on an outer circumferential surface thereof. In the present embodiment, as the joining rotary tool F is rotated counterclockwise, the spiral groove is formed clockwise from the base end toward the distal end. This makes it possible to reduce the amount of the metal to be spilled out of the metal members to be joined (the jacket body 202 and the sealing body 203).

In the second joining step, the joining rotary tool F being rotated is moved along a circumference of the abutment portion J21 to join the abutment portion J21. As shown in FIG. 14, the insertion depth of the joining rotary tool F may be set to such a degree as not to reach the end face 212a of the support part 212. In the present embodiment, with the stirring pin F2 being in contact with the end face 212a of the support part 212, the overlapped portion defined by the end face 212a and the rear face 203b of the support part 203 is also joined together by friction stirring.

Figure 15:
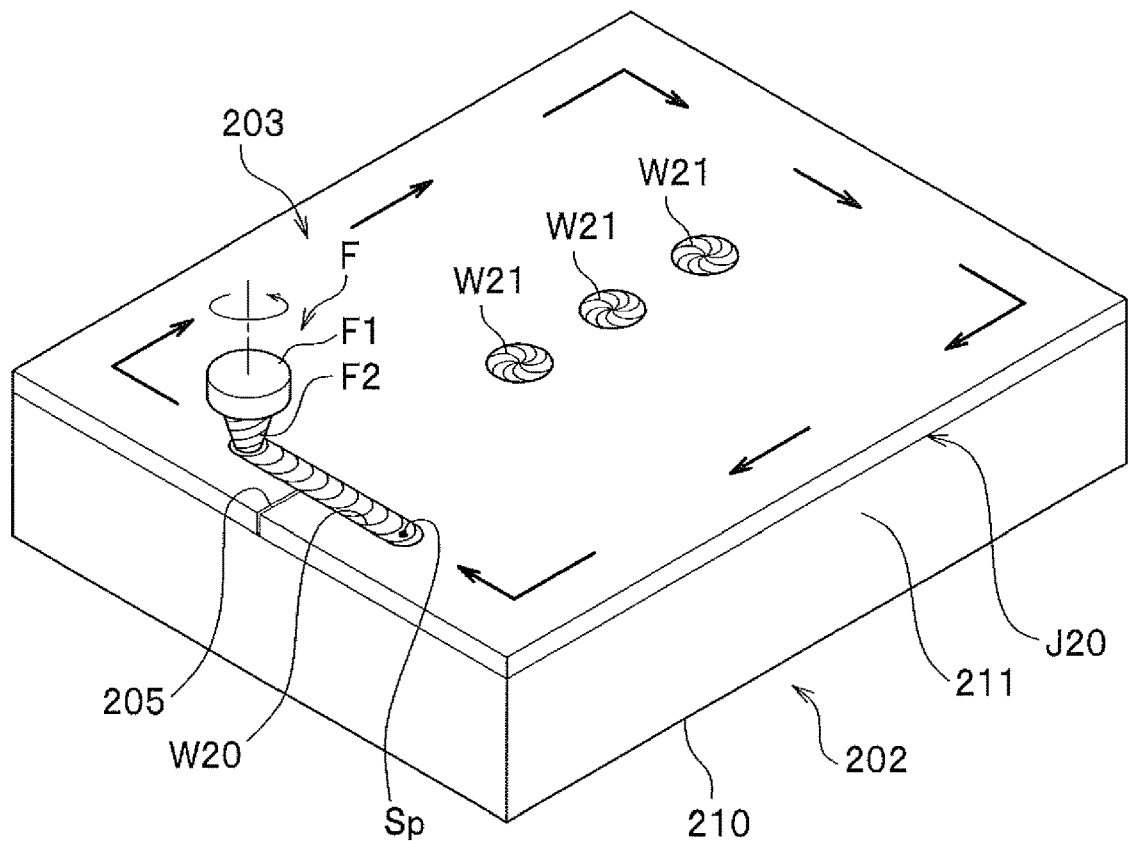
FIG. 15 is a perspective view showing a first joining step according to the third embodiment.

The first joining step as shown in FIG. 15 includes inserting the stirring pin F2 of the joining rotary tool F being rotated counterclockwise into a starting position Sp set on a front surface 203a of the sealing body 203, and moving the joining rotary tool F. In the present embodiment, as the joining rotary tool F is rotated counterclockwise, the spiral groove of the stirring pin F2 is formed clockwise from the base end toward the distal end. The plasticized region W20 is formed along a path on which the joining rotary tool F was moved. The joining step includes moving the joining rotary tool F so that the plasticized region W20 can form a closed loop having a rectangular shape in planar view. Though the joining rotary tool F may be moved either clockwise or counterclockwise, and in the present embodiment, the joining rotary tool F is set to be rotated clockwise with respect to the sealing body 203. In this case, it is preferable to set the path in such a way that the plasticized region W20 passes on an inner end of the slit 205.

Figure 16:
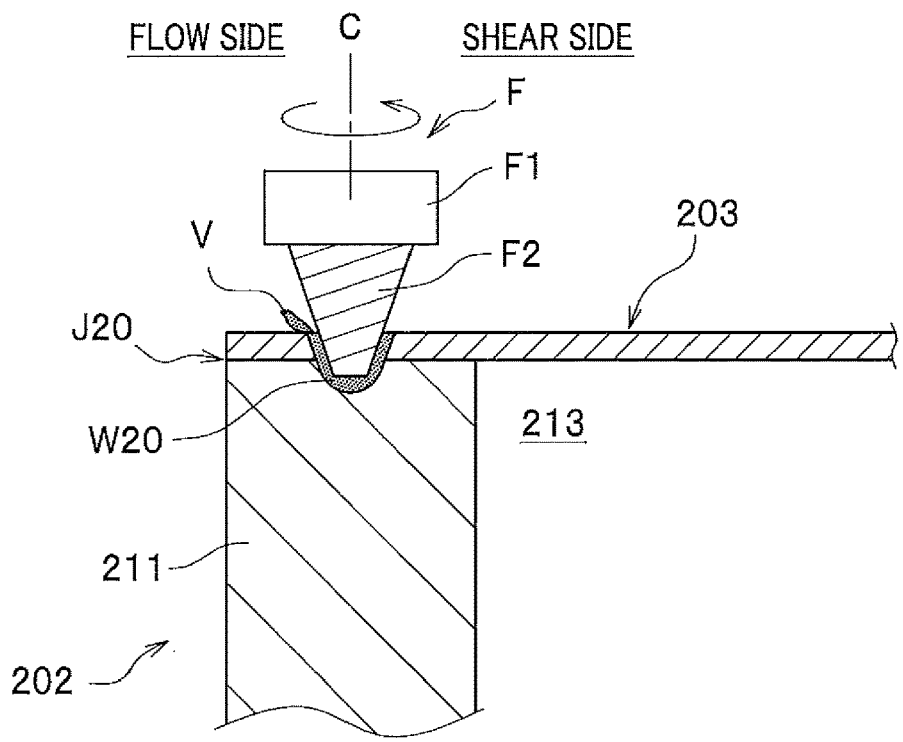
FIG. 16 is a cross-sectional view showing the first joining step according to the third embodiment.

In the first joining step as shown in FIG. 16, friction stir joining is performed with the connection portion F1 not being in contact with the sealing body 203, in other words, with the base end of the stirring pin F2 being exposed. The insertion depth of the joining rotary tool F may be set as appropriate. In the present embodiment, the friction stirring joining is performed in such a way that the stirring pin F2 reaches the peripheral wall part 211, in other words, with the stirring pin F2 being in contact with the sealing body 203 and the peripheral wall part 211.

Note that, in a case where the stirring pin F2 doesn't reach the peripheral wall part 211, in other words, where the stirring pin F2 is contacted with only the sealing body 203, the overlapped portion J20 is plasticized and fluidized by frictional heat generated between the sealing body 203 and the stirring pin F2, to be joined.

In the present embodiment, a movement direction and a rotation direction of the joining rotary tool F are set in such a way that a shear side (an advancing side on which a moving speed of the rotary tool is added to a tangential speed on the circumference of the rotary tool) of the joining rotary tool F is located on an inner side of the sealing body 203. The rotation direction and the movement direction of the joining rotary tool F are not limited to those mentioned above, and may be set as appropriate.

For example, in a case where the rotational speed of the joining rotary tool F is low, a temperature of the plasticized and fluidized material tends to increase more on the shear side than on a flow side (retreating side on which the moving speed of the rotary tool is subtracted from the tangential speed on the circumference of the rotary tool) of the plasticized region W20, so that a recess is formed on the shear side in the plasticized region W20. As a result, burrs V tend to be formed more on the shear side outside the plasticized region W20. On the other hand, for example, in a case where the rotational speed of the joining rotary tool F is high, though the temperature of the plasticized and fluidized material increases more on the shear side, for the high rotational speed, the recess is formed on the flow side in the plasticized region W20. As a result, the burrs V tend to be formed more on the flow side outside the plasticized region W20.

Figure 17:
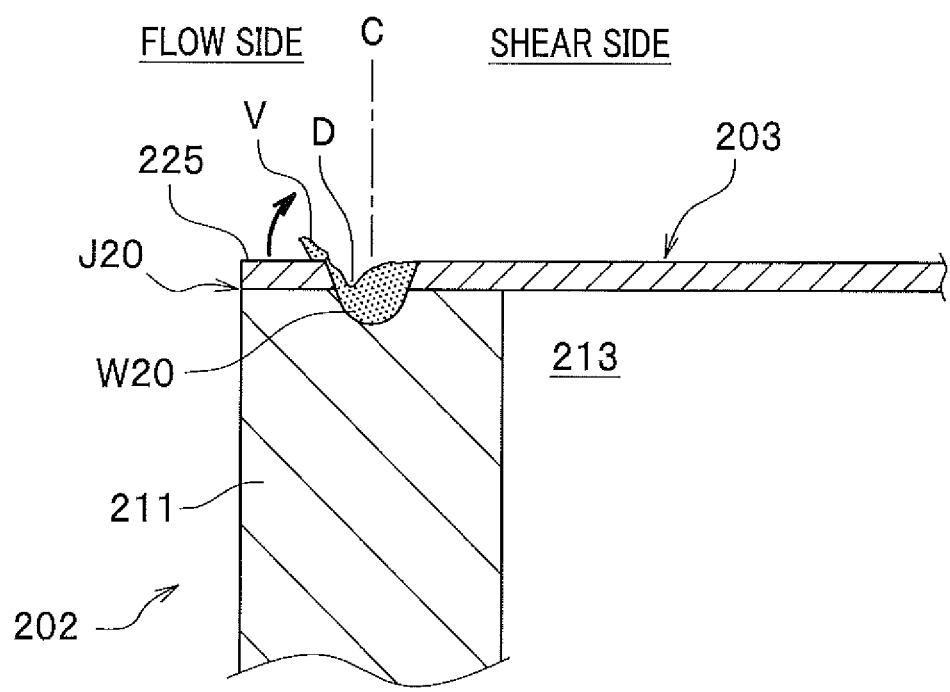
FIG. 17 is a cross-sectional view showing a removing step according to the third embodiment.

In the present embodiment, since the rotational speed of the joining rotary tool F is set high, as shown in FIG. 17, a recess D tends to be formed on the flow side in the plasticized region W20, and the burrs V tend to be formed more outside the plasticized region W20 on the flow side. The recess D is a region that is bored deeper in the plasticized region W20. Further, the rotational speed of the joining rotary tool F is set high, so that the moving speed (feeding speed) of the joining rotary tool F can be increased. This can shorten a joining cycle.

It depends on a joining condition which side in the movement direction of the joining rotary tool F the burrs V are formed at the time of the first joining step. The joining condition is determined by each element of the rotational speed, the rotation direction, and moving speed (feeding speed) of the joining rotary tool F, an inclination angle (taper angle) of the stirring pin F2, materials for the jacket body 202 and the sealing body 203, and a thickness of the sealing body 203 or the like, and a combination of these elements. If the side on which the burrs V are formed or the side on which the burrs V are formed more is set so as to be an outer edge side of the sealing body 203 according to the joining condition, the recess D formed in the plasticized region W20 also tends to be formed at an outer side on the sealing body 203 to preferably facilitate the removing step mentioned below.

In the first joining step, the joining rotary tool F is moved round, and the joining rotary tool F is removed from the plasticized region W20. In the joining step, the starting end of the plasticized region W20 is set to be overlapped with the terminal end of the plasticized region W20.

In the removing step as shown in FIG. 17, a surplus piece part 225 that is part of the sealing body 203 is removed. The surplus piece part 225 is a part that is removed in the sealing body 203 with the plasticized region W20 as a boundary. In the present embodiment, the part outside the recess D formed in the sealing body 203 is defined as the surplus piece part 225.

In the removing step, with the slit 205 (see FIG. 15) as a starting point, an end part of the surplus piece part 225 is turned up and folded to be removed. Thereby, the peripheral edge part of the sealing body 203 is bordered with the plasticized region W20. In the removing step, the surplus piece part 225 may be folded by a device. In the present embodiment, the surplus piece part 225 is folded by hand to be removed. The liquid cooling jacket 201 as shown in FIG. 9 is thus manufactured.

According to the method of manufacturing the liquid cooling jacket and the liquid cooling jacket 201 as explained above, each of the projecting parts 214 of the support part 212 is inserted into each of the holes 204 of the sealing body 203 so that the sealing body 203 is easily positioned relative to the jacket body 202. Further, the jacket body 202 and the sealing body 203 are joined together by friction stirring so that water-tightness and air-tightness can be enhanced.

The joining condition is set in such a way that the burrs V are formed at the outer side on the sealing body 203 as in the joining step according to the present embodiment, so that the burrs V formed by friction stir joining can be removed easily together with the surplus piece part 225.

Further, according to the present embodiment as shown in FIG. 17, the recess D is formed in the plasticized region 20 and at an outer side with respect to a joining center line C (an outer side in the sealing body 203). Furthermore, the burrs V are formed outside the plasticized region W20 and at the outer side with respect to the joining center line C, so that the burrs V can be removed efficiently with the surplus piece part 225. Thereby, the surplus piece part 225 to be removed can be made narrow, and a large part of the joint (plasticized region W20) can remain, so that a joining strength can be enhanced. Additionally, the surplus piece part 225 can be folded easily due to the recess D, while the joint (plasticized region W20) can be cleanly finished without an additional burr removing operation.

In the first joining step, friction stir joining is performed either by moving the stirring pin F2 along the overlapped portion J20 with only the stirring pin F2 being in contact with the peripheral wall part 211 and the sealing body 203, or by moving the stirring pin F2 along the overlapped portion J20 with only the stirring pin F2 being in contact with only the sealing body 203. Accordingly, the overlapped portion J20 located at deep positions can be joined without a large load exerted on the friction stirring device. Further, in the second joining step, friction stirring is performed by moving the stirring pin F2 along the abutment portion J21 with only the stirring pin F2 being in contact with each of the projecting parts 214 and the sealing body 203. Accordingly, the abutment portion J21 can be joined up to a deep position without a large load exerted on the friction stirring device.

In the first joining step, friction stir joining is performed either with only the stirring pin F2 being in contact with the peripheral wall part 211 and the sealing body 203 or with only the stirring pin F2 being in contact with only the sealing body 203. Accordingly, a width of each of the plasticized regions W can be made narrower compared to a case where the shoulder portion is pressed into the sealing body 203. This prevents the plasticized and fluidized material from flowing into the hollow section of the liquid cooling jacket 201 without increasing a width of the peripheral wall part 211. Further, in the second joining step, since only the stirring pin F2 is inserted into the abutment portion J21, each of the plasticized regions W21 can be made narrower compared to a case where the shoulder portion is pressed into each of the projecting parts 214 and the sealing body 203. This prevents the plasticized and fluidized material from flowing into the hollow section of the liquid cooling jacket 201 without increasing a width of the support part 212. This can enhance design flexibility of the jacket body 202 (the support part 212).

The third embodiment of the present invention has been explained as above, but the design thereof may be modified as appropriate without departing from the spirit of the present invention. For example, the method preferably includes a provisional joining step of performing provisional joining on at least either of the overlapped portion J20 and the abutment portion J21, prior to the joining step. The provisional joining step may be performed by welding or friction stirring with the rotary tool. Thereby, it is possible to prevent gaps in the overlapped portion J20 from being generated in the first joining step.

Fourth Embodiment

Figure 18:
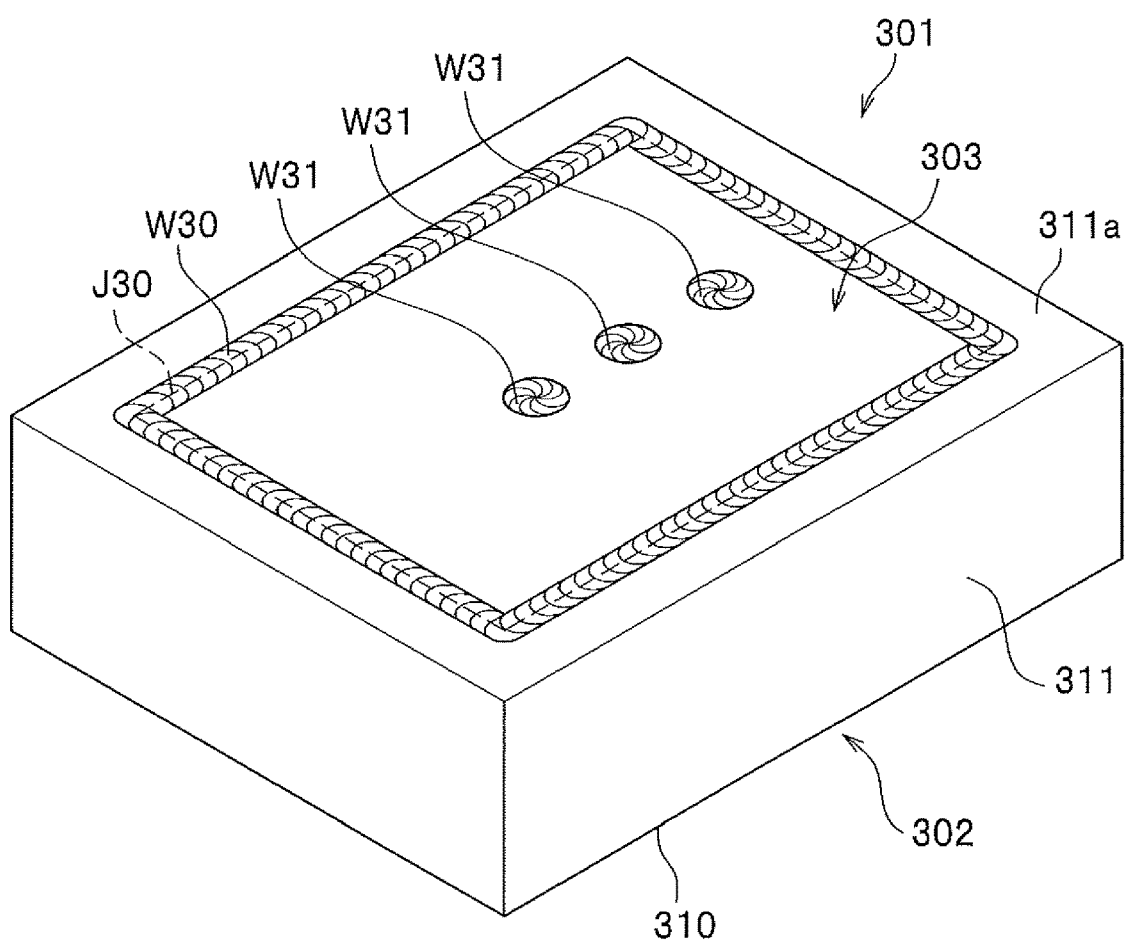
FIG. 18 is a perspective view showing a liquid cooling jacket according to a fourth embodiment of the present invention.

A Detailed description will be given of a liquid cooling jacket and a method of manufacturing a liquid cooling jacket according to a fourth embodiment of the present invention with reference to the drawings. As shown in FIG. 18, a liquid cooling jacket 301 according to the present embodiment is composed of a jacket body 302 and a sealing body 303. The liquid cooling jacket 301 is an apparatus that allows fluid to flow thereinto to exchange heat with a heat-generating element (not shown) installed in the liquid cooling jacket 301.

Figure 19:
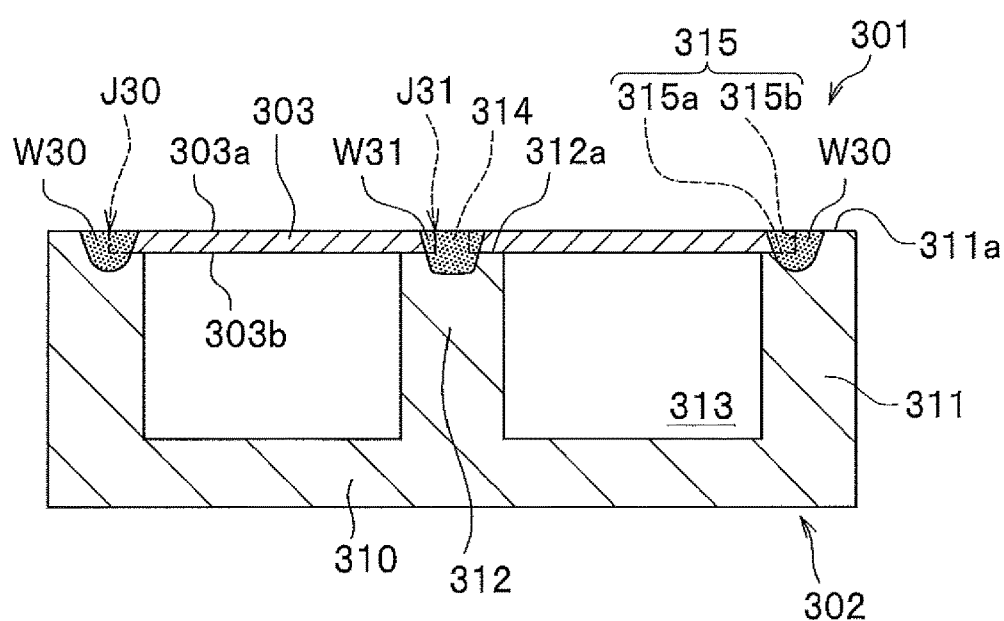
FIG. 19 is a cross-sectional view showing the liquid cooling jacket according to the fourth embodiment of the present invention.

The jacket body 302 is configured to include a bottom part 310, a peripheral wall part 311, and a support part 312 as shown in FIG. 19. The jacket body 302 has a box-shaped body of which an upper part is open. The jacket body 302 is formed of aluminum alloy in the present embodiment. A material for the jacket body 302 is suitably selected from among metals, for example, aluminum, aluminum alloy, copper, copper alloy, titanium, titanium alloy, magnesium, magnesium alloy or the like, which can be stirred by friction. The bottom part 310 has the form of a rectangular plate in planar view. The peripheral wall part 311 is erected on the peripheral edge of the bottom part 310, and has the form of a rectangular frame in planar view. The bottom part 310 and the peripheral wall part 311 define recesses 313 therein.

The peripheral wall part 311 has a stepped portion 315 formed on an inner peripheral edge thereof. The stepped portion 315 is composed of a stepped bottom surface 315$a$ and a stepped side surface 315$b$ rising from the stepped bottom surface 315$a$. The stepped bottom surface 315$a$ is formed at a position below by one step from an end face 311$a$ of the peripheral wall part 311.

As shown in FIG. 20, the support part 312 is formed continuously to one wall part of the peripheral wall part 311, and is separated from the other wall part facing the one wall part. An end face 312$a$ of the support part 312 and a stepped bottom surface 315$a$ are flush with each other. The support part 312 has projecting parts 314 formed on the end face 312$a$ thereof. The height of each of the projecting parts 314 is substantially equal to the thickness of the sealing body 303. The shape of each of the projecting parts 314 is not particularly limited, and in the present embodiment, has a columnar shape. Further, the number of the projecting parts 314 is not particularly limited. In the present embodiment, three projecting parts 314 are formed.

The sealing body 303 is a plate member of a rectangular form, which seals the opening of the jacket body 302 as shown in FIG. 18 and FIG. 19. The sealing body 303 has such a size as to be disposed on the stepped portion 315 with no gap. The sealing body is formed of the same metal material as that of the jacket body 302. The thickness of the sealing body 303 is equal to the height of the stepped side surface 315$b$. The sealing body 303 has each of holes 324 formed at a position corresponding to a position of each of the projecting parts 314. Each of the holes 324 has such a size that each of the projecting parts 314 is inserted thereinto with no gap.

Next, a description will be given of the method of manufacturing the liquid cooling jacket according to the present embodiment. The method of manufacturing the liquid cooling jacket includes a preparation step, a sealing body disposing step, an auxiliary member disposing step, a joining step, and a removing step.

In the preparation step, the jacket body 302 and the sealing body 303 are prepared as shown in FIG. 20. The jacket body 302 is prepared, for example, by die casting.

Figure 21:
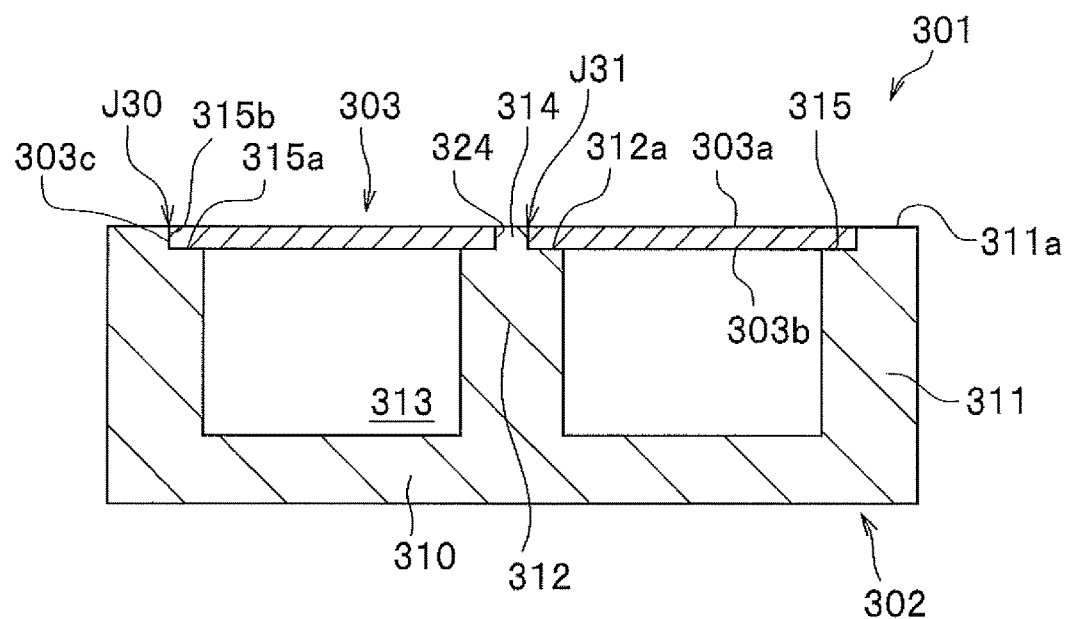
FIG. 21 is a cross-sectional view showing a sealing body disposing step according to the fourth embodiment.

In the sealing body disposing step, the sealing body 303 is disposed on the jacket body 302 to define a first abutment portion J30 and second abutment portions J31. As shown in FIG. 21, in the sealing body disposing step, the sealing body 303 is disposed on the stepped bottom surface 315a of the peripheral wall part 311. Thereby, a side surface 303c of the sealing body 303 is abutted on a stepped side surface 315b to define the first abutment portion J30. Further, each of the projecting parts 314 is inserted into each of the holes 324, and as a result, an outer peripheral surface of each of the projecting parts 314 is abutted on a wall of each of the holes 324 to define the second abutment portions J31.

Figure 22:
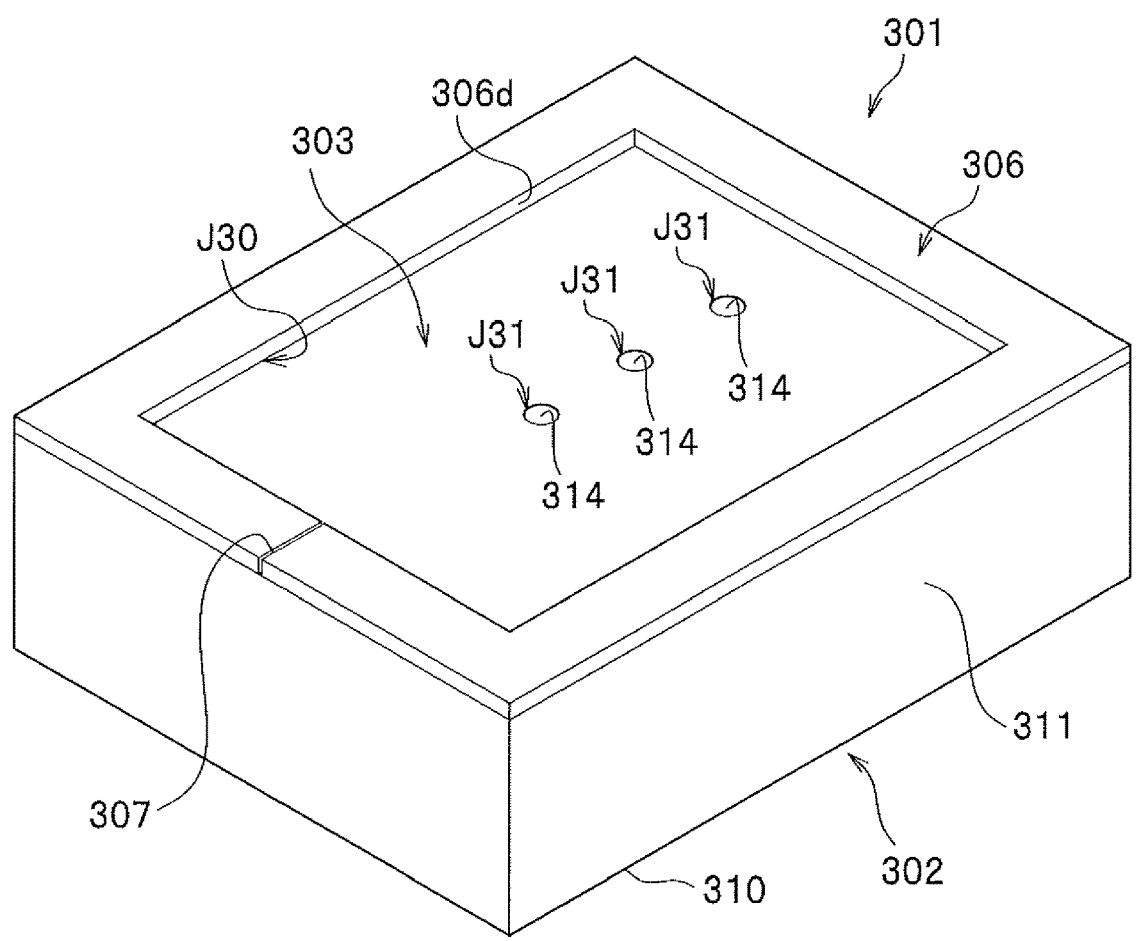
FIG. 22 is a perspective view showing an auxiliary member disposing step according to the fourth embodiment.

In the auxiliary member disposing step, an auxiliary member 306 is disposed along the first abutment portion J30 as shown in FIG. 22. The auxiliary member 306 is a plate member having the form of a rectangular frame in planar view. A material for the auxiliary member 306 may be metal which can be stirred by friction. In the present embodiment, the auxiliary member 306 is formed of the same material as that for the jacket body 302 and the sealing body 303. The auxiliary member 306 has a size such that an inner peripheral surface 306d (see FIG. 26) thereof is in line with the first abutment portion J30. The thickness of the auxiliary member 306 may be set as appropriate to such a degree that the plasticized region W30 is not short of metal in the first joining step described as below.

Further, in the present embodiment, the position of the inner peripheral surface 306d of the auxiliary member 306 and the position of the first abutment portion J30 are set to overlap with each other, however, the inner peripheral surface 306d may be positioned either at an inner side or at an outer side of the first abutment portion J30. The position of the inner peripheral surface 306d of the auxiliary member 306 is preferably set to such a degree that the plasticized region W30 is not short of metal, and that the auxiliary member 306 doesn't remain on the peripheral wall part 311 in the removing step described below.

The auxiliary part 306 has a slip 307 formed continuously in the width direction. Further, the jacket body 302, the sealing body 303, and the auxiliary member 306 are immovably fixed on a table with a fixing tool such as a clamp.

The joining step includes a first joining step and a second joining step with the joining rotary tool (rotary tool) F as shown in FIG. 23 to FIG. 26. In the first joining step, the abutment portion J30 is joined together by friction stirring. In the second joining step, each of the abutment portions J31 is joined together by friction stirring. Either of the first joining step or the second joining step may be performed first. In the present embodiment, the second joining step is performed first.

Figure 23:
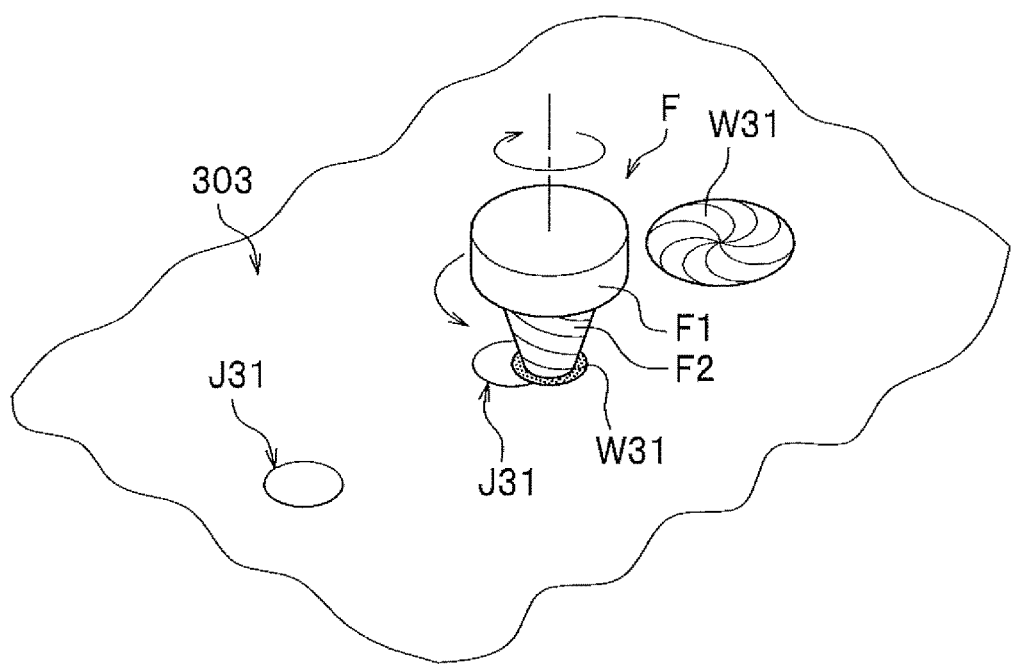
FIG. 23 is a perspective view showing a second joining step according to the fourth embodiment.
Figure 24:
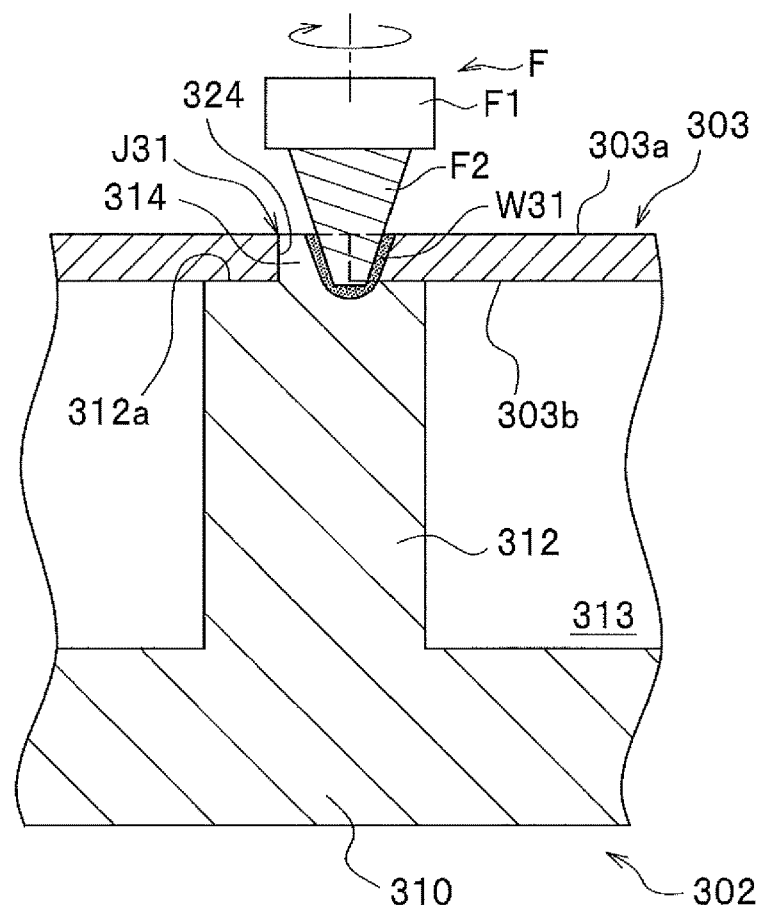
FIG. 24 is a cross-sectional view showing the second joining step according to the fourth embodiment.

In the second joining step as shown in FIG. 23 and FIG. 24, the joining rotary tool F being rotated is moved along each of the circumferences of the abutment portions J31 to join each of the abutment portions J31. The joining rotary tool F is composed of the connection portion F1 and the stirring pin F2. The stirring pin F2 has a spiral groove engraved on an outer circumferential surface thereof. In the present embodiment, as the joining rotary tool F is rotated clockwise, the spiral groove is formed counterclockwise from the base end toward the distal end. This makes it possible to reduce the amount of metal to be spilled out of the metal members to be joined (the jacket body 302, the sealing body 303 and the auxiliary member 306).

In the second joining step as shown in FIG. 23 and FIG. 24, each of the abutment portions J31 is joined together by allowing the joining rotary tool F being rotated along each of the circumferences of the abutment portions J31. The insertion depth of the joining rotary tool F may be set to such a degree as not to reach the end face 312a of the support part 312. In the present embodiment, with the stirring pin F2 being in contact with the end face 312a of the support part 312, the overlapped portion defined by the end face 312a and the rear face 303b of the sealing body 303 is joined together by friction stirring. Plasticized regions W31 are formed through the second joining step.

Figure 25:
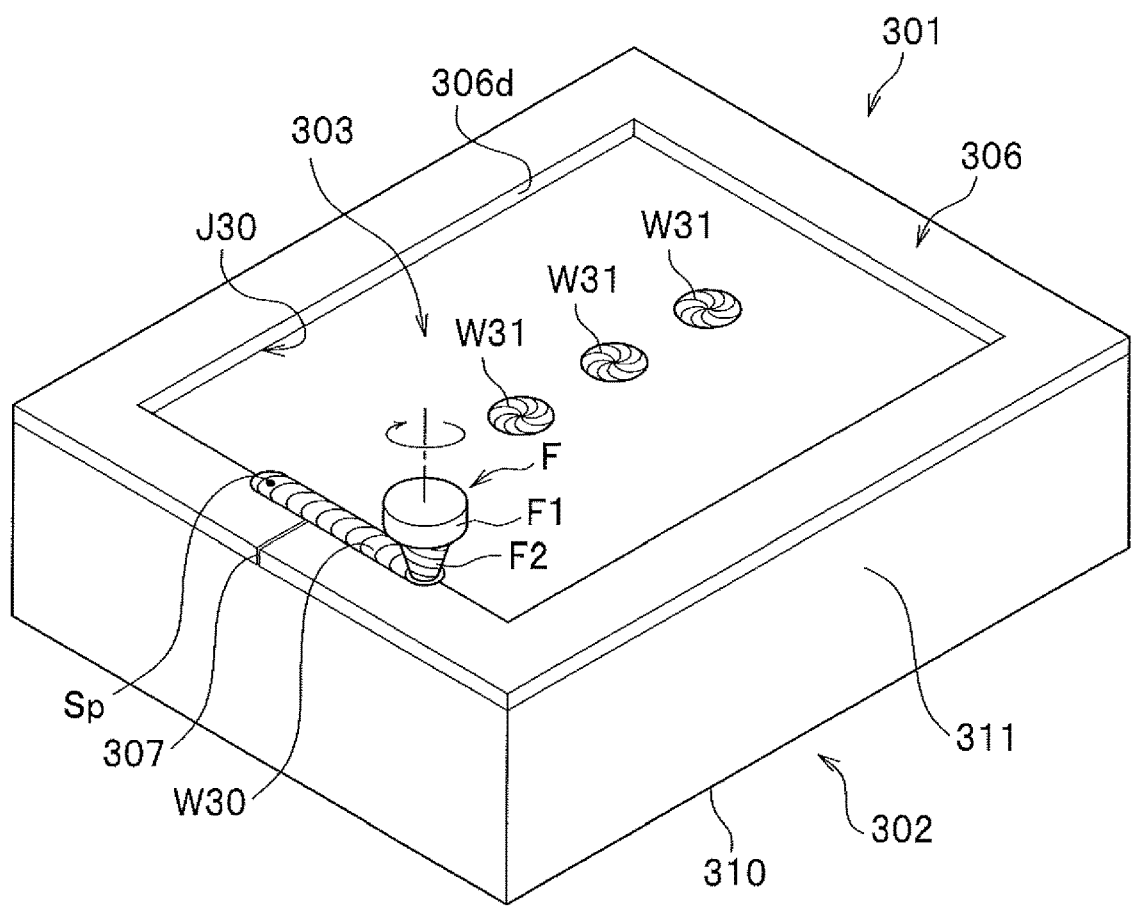
FIG. 25 is a perspective view showing a first joining step according to the fourth embodiment.
Figure 26:
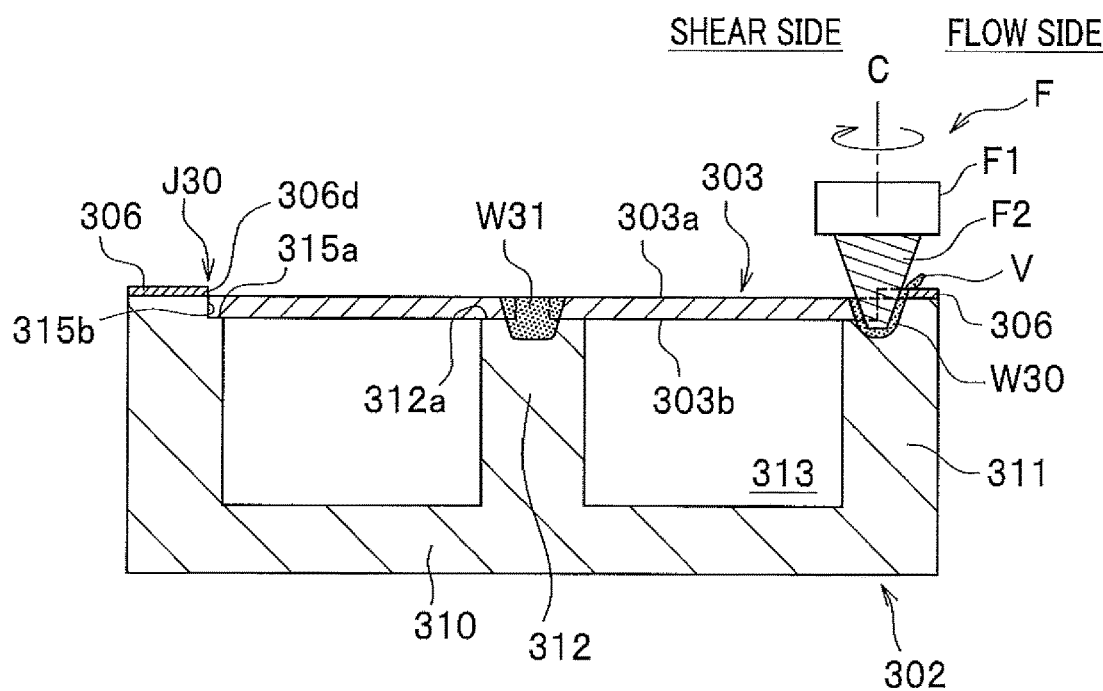
FIG. 26 is a cross-sectional view showing the first joining step according to the fourth embodiment.

In the first joining step as shown in FIG. 25 and FIG. 26, the stirring pin F2 of the joining rotary tool F being rotated clockwise is inserted into a starting position Sp set on the first abutment portion J30 to move the joining rotary tool F in such a way as to trace the first abutment portion J30. The plasticized region W30 is formed along a path on which the joining rotary tool F was moved. In the present embodiment, a part of plasticized region W30 is brought into contact with the slit 307. In the first joining step, the joining rotary tool F is moved around the sealing body 303 so that the plasticized region W30 can form a closed loop. The joining rotary tool F may be moved either clockwise or counterclockwise. In the present embodiment, the joining rotary tool F is set to be rotated counterclockwise relative to the sealing tool 303. In this case, the inner peripheral surface 306d of the auxiliary member 306 is brought into contact with the stirring pin F2 so that the peripheral wall part 311, the sealing body 303, and the auxiliary member 306 are simultaneously joined together by friction stirring.

In the first joining step as shown in FIG. 26, friction stir joining is performed with the connection portion F1 being not in contact with the sealing body 303 and the auxiliary member 306, in other words, with the base end of the stirring pin F2 being exposed. The insertion depth of the joining rotary tool F may be set as appropriate. In the present embodiment, friction stir joining is performed in such a way that the stirring pin F2 reaches the stepped bottom surface 315a. Thereby, in addition to the first abutment portion J30, the overlapped portion defined by the stepped bottom surface 315a and the rear face 303b of the sealing body 303 are joined together by friction stirring.

In the present embodiment, the movement direction and rotation direction of the joining rotary tool F are set in such a way that the shear side (advancing side on which the moving speed of the rotary tool is added to the tangential speed on the circumference of the rotary tool) of the joining rotary tool F is located on the inner side of the sealing body 303. The rotation direction and movement direction of the joining rotary tool F are not limited to the above, but may be set as appropriate.

For example, in a case where the rotational speed of the joining rotary tool F is low, the temperature of the plasticized and fluidized material tends to increase more on the shear side than on the flow side (retreating side on which the moving speed of the rotary tool is subtracted from the tangential speed on the circumference of the rotary tool) of the plasticized region W30, so that the recess is formed on the shear side in the plasticized region W30. As a result, burrs V tend to be formed more on the shear side outside the plasticized region W30. On the other hand, for example, in a case where the rotational speed of the joining rotary tool F is high, though the temperature of the plasticized and fluidized material increases more on the shear side, for the high rotational speed, the recess is formed on the flow side in the plasticized region W30. As a result, the burrs V tend to be formed more on the flow side outside the plasticized region W30.

Figure 27:
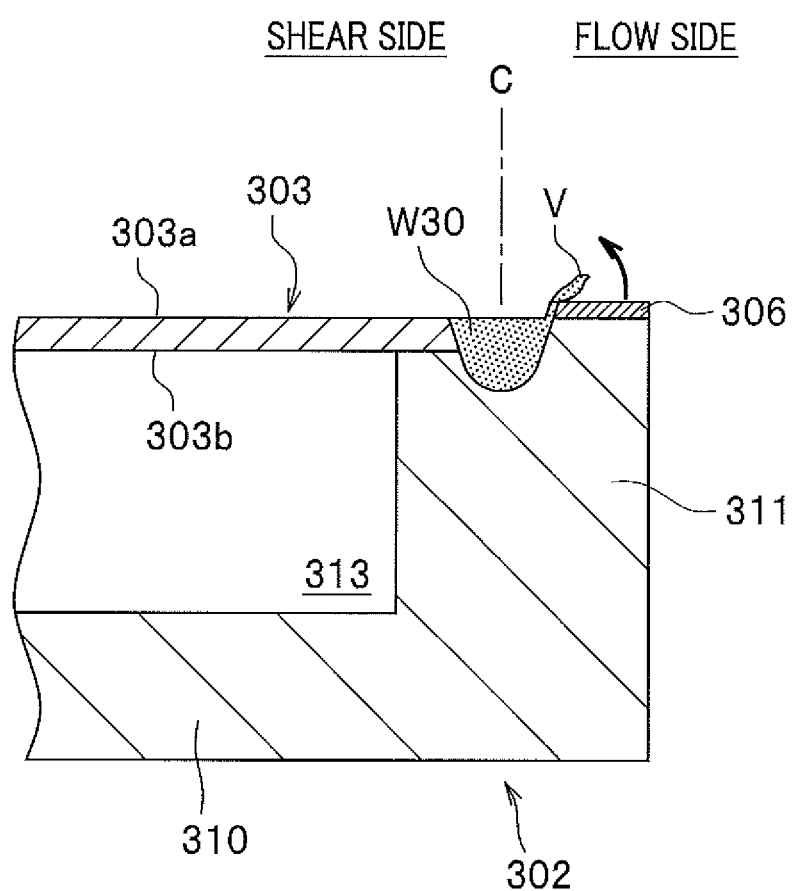
FIG. 27 is a cross-sectional view showing a removing step according to the fourth embodiment.

In the present embodiment, since the rotational speed of the joining rotary tool F is set high, the burrs V tend to be formed more on the flow side outside the plasticized region W30 as shown in FIG. 27. On the other hand, in the present embodiment, since the auxiliary member 306 is also joined together by friction stirring simultaneously, the recess is not formed in the plasticized region W30, preventing the shortage of metal in the plasticized region W30. Further, the rotational speed of the joining rotary tool F is set high so that the moving speed (feeding speed) of the joining rotary tool F can be enhanced. Thereby, the joining cycle can be shortened.

It depends on a joining condition which side in the movement direction of the joining rotary tool F the burrs V are formed at the time of the first joining step. The joining condition is determined by each element of the rotational speed, the rotation direction, and the moving speed (feeding speed) of the joining rotary tool F, an inclination angle (taper angle) of the stirring pin F2, materials for the jacket body 302 and the sealing body 303 and a thickness of the sealing body 303 or the like, and combinations of these elements. If the side on which the burrs V are formed or formed more is set to be located on the side of the auxiliary member 306 according to the joining condition, it is preferable that the removing step described below can be easily performed.

In the first joining step, the joining rotary tool F is moved round along the first abutment portion J30, and then the joining rotary tool F is removed from the plasticized region W30. In the first joining step, the starting end is overlapped with the terminal end of the plasticized region W30.

In the removing step as shown in FIG. 27, the auxiliary member 306 is removed. In the removing step, with the slit 307 (see FIG. 25) as a starting point, the end part of the auxiliary member 306 is turned up and folded to be removed. In the removing step, the auxiliary member 306 may be folded by a device. In the present embodiment, is folded by hand to be removed. The liquid cooling jacket 301 as shown in FIG. 18 and FIG. 19 is thus manufactured.

According to the method of manufacturing the liquid cooling jacket and the liquid cooling jacket 301, it is possible to easily position the sealing body 303 relative to the jacket body 302 by inserting each of the projecting parts 314 of the support part 312 into each of the holes 324 of the sealing body 303 respectively.

Further, according to the first joining step, since the auxiliary member 306 is joined together by friction stirring in addition to the peripheral wall part 311 and the sealing body 303, it is possible to prevent the shortage of metal in the joint (the plasticized region W30). Furthermore, the joining condition is set such that the burrs are formed on the auxiliary member 306 in the first joining step, and the removing step of removing the auxiliary member 306 on which the burrs V are formed is performed, so that the burrs V can be removed easily. This allows the joint (the plasticized region W30) to be cleanly finished without an additional burr removing operation.

Additionally, friction stirring is performed with only the stirring pin F2 being in contact with the peripheral wall part 311, the sealing body 303, and the auxiliary member 306, so that the first abutment portion J30 can be joined together at deep positions by friction stirring with less load being exerted on the friction stirring device compared to the case in which the shoulder portion is pressed on the metal members to be joined.

Here, in a case where the shoulder portion is brought into contact with the peripheral wall part 311 and the sealing body 303 as in the traditional way, a width of the stepped bottom surface 315a is required to be set wide so as not to allow the plasticized and fluidized material to flow into the liquid cooling jacket 301. However, as in the present embodiment, friction stirring is performed with only the stirring pin F2 being in contact with the peripheral wall part 311, the sealing body 303 and the auxiliary member 306 so that the width of the plasticized region W30 can be made narrow. Consequently, the widths of the stepped bottom surface 315a and the peripheral wall part 311 can be made narrow, resulting in the enhancement of design flexibility.

In the second joining step, the support part 312 and the sealing body 303 are joined, so that the strength of the liquid cooling jacket 301 can be enhanced. Here, in a case where the shoulder portion is brought into contact with each of the projecting parts 314 and the sealing body 303 as in the traditional way, the width of the support part 312 is required to be set wide so as not to allow the plasticized and fluidized material to flow in the liquid cooling jacket 301. However, as in the present embodiment, the width of each of the plasticized regions W31 can be made narrow by performing friction stirring with only the stirring pin F2 being in contact with each of the projecting parts 314 and the sealing body 303. Thereby, the width of the support part 312 can be made narrow, resulting in the enhancement of design flexibility.

Figure 28:
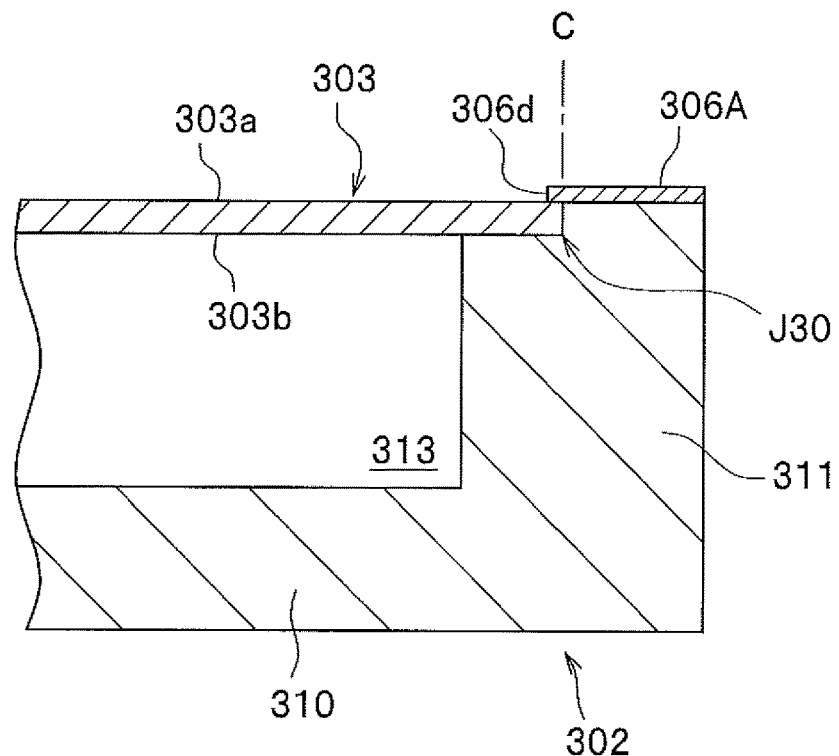
FIG. 28 is s cross-sectional view showing a first variation according to the fourth embodiment.

FIG. 28 is a cross-sectional view showing a first variation of the fourth embodiment. As shown in FIG. 28, in the auxiliary member disposing step, the auxiliary member 306A may be projected in such a way that an inner peripheral surface 306d thereof is located on the inner side than the first abutment portion J30. Disposing the auxiliary member 306A in such a way reliably prevents the shortage of metal in the plasticized region W30. Further, the joining rotary tool F can be easily inserted from the front face side of the auxiliary member 306A. It is preferable that the auxiliary member 306A (the inner peripheral surface 306d) is adjusted as appropriate so as to prevent the shortage of metal in the whole of the plasticized region W30, and, to prevent the auxiliary member 306A from remaining on the peripheral wall part 311 after the removing step.

Figure 29:
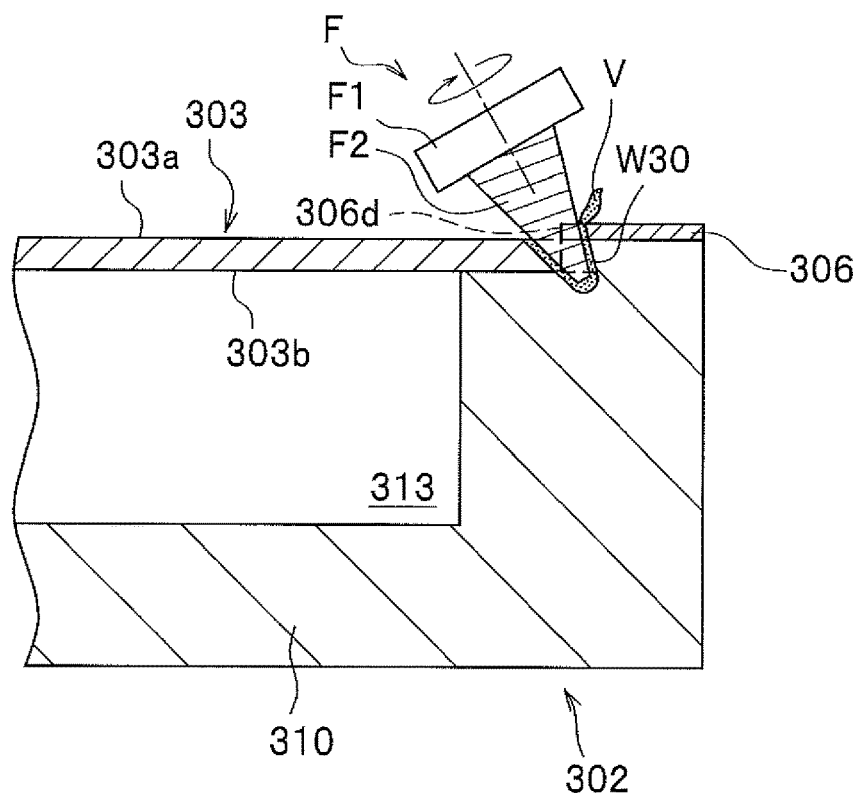
FIG. 29 is a cross-sectional view showing a second variation according to the fourth embodiment.

FIG. 29 is a cross-sectional view showing a second variation of the fourth embodiment. As shown in FIG. 29, friction stir joining may be performed with the joining rotary tool F of which the center axis for rotation being inclined inward (the center side of the jacket body 302) in the first abutment portion. In other words, in the first abutting step, the stirring pin F2 may be inserted into an inner corner defined by the front surface 303a of the sealing body 303 and the inner peripheral surface 306d of the auxiliary member 306. This can allow the peripheral wall part 311, the sealing body 303, and the auxiliary member 306 to be easily joined together, and can prevent more reliably the shortage of metal in the joint (the plasticized region W30). Further, the stirring pin F2 is easily inserted into the inner corner. Furthermore, in the second variation of the fourth embodiment, the first joining step may be performed with the joining rotary tool F mounted on a robot arm which has a driving unit such as a spindle unit provided on the tip thereof. Thereby, the central axis for rotation of the joining rotary tool F can be easily inclined.

Figure 30:
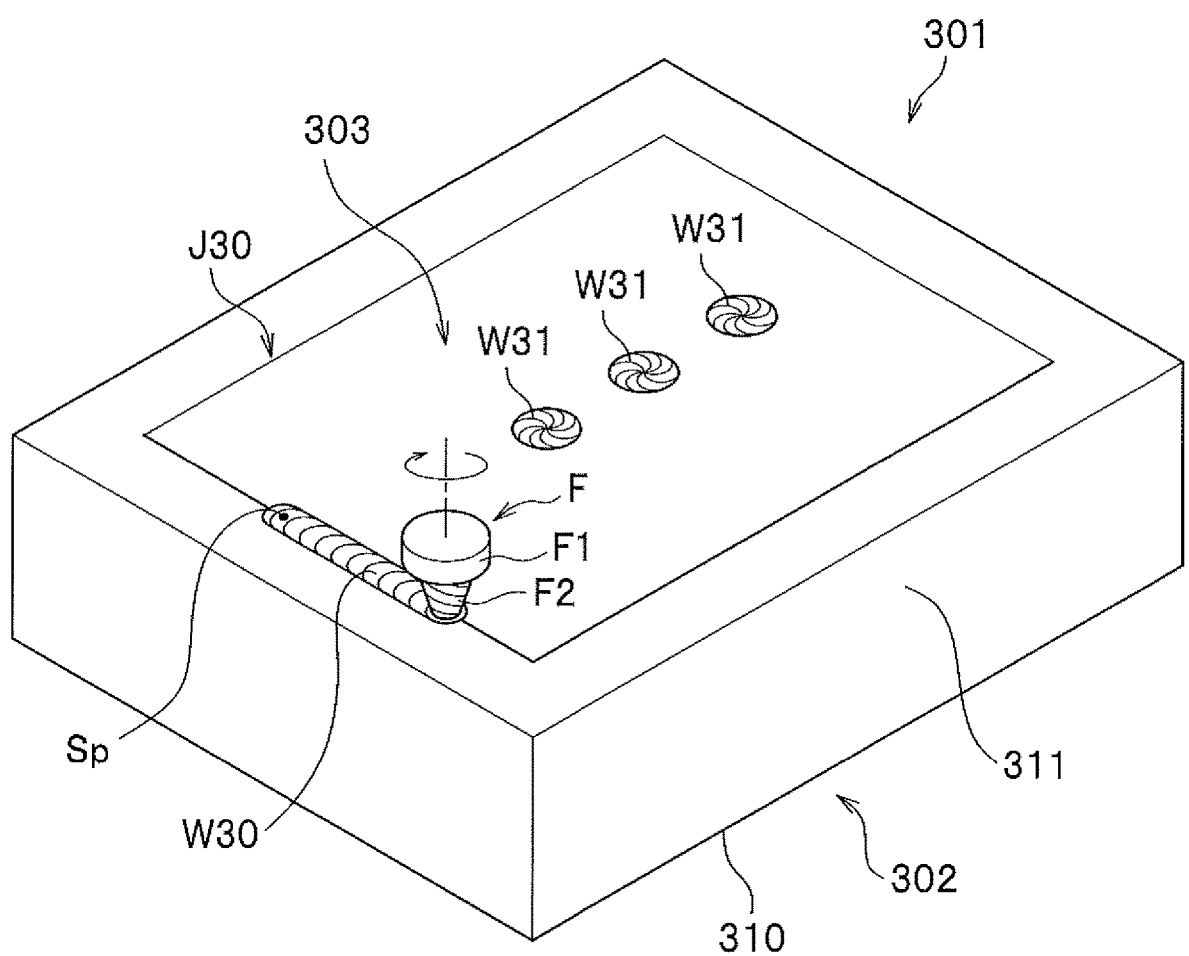
FIG. 30 is a perspective view showing a third variation according to the fourth embodiment.

FIG. 30 is a perspective view showing a third variation of the fourth embodiment. As shown in FIG. 30, in the first joining step according to the third variation of the fourth embodiment, friction stirring is performed with only the stirring pin F2 being in contact with the peripheral wall part 311 and the sealing body 303. As shown in the third variation, in the first joining step, friction stirring may be performed on the first abutment portion J30 with the auxiliary member 306 being eliminated.

The embodiments and variations of the present invention have been described as above, but can be modified without departing from the spirits of the present invention. For example, it is preferable to include a provisional joining step for performing provisional joining on at least either of the first abutment portion J30 and the second abutment portions J31, prior to the first and the second joining steps. Thereby, it is possible to prevent the gaps of the first abutment portion J30 from being generated at the time of the first joining step. The provisional joining step may be performed by friction stir joining or welding.

REFERENCE SIGNS LIST 1 first metal member
2 second metal member
10 projecting part
10a peripheral side face
11 hole
11a hole wall
201 liquid cooling jacket
202 jacket body
203 sealing body
210 bottom part
211 peripheral wall part
211a end face
212 support part
212a end face
213 recess
214 projecting part
204 hole
301 liquid cooling jacket
302 jacket body
303 sealing body
310 bottom part
311 peripheral wall part
311a end face
312 support part
312a end face
313 recess
314 projecting part
324 hole
F rotary tool (Joining rotary tool)
F1 connection portion
F2 stirring pin
J1 abutment portion
J2 abutment portion
J20 overlapped portion
J21 abutment portion
J30 first abutment portion
J31 second abutment portions
W plasticized region
W20 plasticized region
W30 plasticized region
W31 plasticized region

What is claimed is:

1. A method of manufacturing a liquid cooling jacket in which a jacket body and a sealing body are joined together by friction stirring to form a liquid cooling jacket comprising:
a preparation step of forming the jacket body that includes a bottom part, a peripheral wall part rising from a peripheral edge of the bottom part and a support part erected on the bottom part and formed with a plurality of projecting parts on an end face thereof, and forming a sealing body that is formed with the hole into which the plurality of projecting parts are inserted respectively and that seals an opening of the jacket body;
a disposing step of disposing the sealing body on the jacket body to form an overlapped portion in which an end face of the peripheral wall part and a rear face of the sealing body are overlapped with each other, and to define an abutment portion on which an outer peripheral surface of the projecting part and a wall of the hole are abutted on each other; and
a joining step of moving a rotary tool along the overlapped portion and each of the abutment portions to perform friction stirring,
wherein the rotary tool has a stirring pin of which a length is greater than a thickness of the sealing body;
wherein the rotary tool is moved along the overlapped portion with only the stirring pin of the rotary tool being in contact with both of the peripheral wall part and the sealing body so as to join the overlapped portion by friction stirring, or the rotary tool is moved along the overlapped portion with only the stirring pin of the rotary tool being in contact with only the sealing body so as to join the overlapped portion by friction stirring where a movement direction and a rotation direction of the rotary tool are set in such a way that an advancing side of the rotary tool is located on an inner side of the sealing body; and
wherein the rotary tool is moved along the abutment portion with only the stirring pin of the rotary tool being in contact with both of the outer peripheral surface of the projecting part and the wall of the hole so as to join each of the abutment portions by friction stirring.

2. The method of manufacturing the liquid cooling jacket according to claim 1 further comprising:
wherein in the joining step, a joining condition is set in such a way that burrs are formed at an outer side on the sealing body; and
wherein the joining step includes a removing step of removing a surplus piece part of the sealing body with the burrs with a recess formed in a plasticized region as a boundary.

3. The method of manufacturing the liquid cooling jacket according to claim 1 further comprising:
a provisional joining step of performing provisional joining on at least either of the overlapped portion and the abutment portion, prior to the joining step.

4. A method of manufacturing a liquid cooling jacket in which a jacket body and a sealing body are joined together by friction stirring to form the liquid cooling jacket comprising:
a preparation step of forming a jacket body that includes a bottom part, a peripheral wall part rising from a peripheral edge of the bottom part, a stepped bottom surface formed at a position below by one step from an end face of the peripheral wall part, a stepped side surface rising from the stepped bottom surface, and a support part erected on the bottom surface and formed with a plurality of projecting parts on an end face thereof, and forming a sealing body that is formed with a plurality of holes into which the plurality of projecting parts are inserted respectively and that seals an opening of the jacket body;
a sealing body disposing step of disposing the sealing body on the jacket body to abut the stepped side surface on a side surface of the sealing body to form a first abutment portion, and abutting an outer peripheral surface of the projecting part on a wall of the hole to form a plurality of second abutment portions; and a joining step of moving a rotary tool along the first abutment portion and each of the plurality of second abutment portions to perform friction stirring, wherein the rotary tool is moved along the first abutment portion with only a stirring pin of the rotary tool being in contact with both of the stepped side surface and the side surface of the sealing body to join the first abutment portion by friction stirring where a movement direction and a rotation direction of the rotary tool are set in such a way that an advancing side of the rotary tool is located on an inner side of the sealing body; and wherein the rotary tool is moved along the second abutment portion with only the stirring pin of the rotary tool being in contact with both of the outer peripheral surface of the projecting part and the wall of the hole to join each of the plurality of second abutment portions by friction stirring.

5. The method of manufacturing the liquid cooling jacket according to claim 4 further comprising:

an auxiliary member disposing step of disposing an auxiliary member along the first abutment portion, wherein in the joining step, the first abutment portion is joined together by friction stirring with only the stirring pin being in contact with the peripheral wall part, the sealing body and the auxiliary member.

6. The method of manufacturing the liquid cooling jacket according to claim 5, wherein in the joining step, a joining condition is set in such a way that burrs are formed on the auxiliary member; and wherein the joining step includes a removing step of removing the auxiliary member on which the burrs are formed.

7. The method of manufacturing the liquid cooling jacket according to claim 5, wherein in the joining step, friction stir joining is performed with the rotary tool of which a central axis for rotation being inclined toward an inside of the jacket body.

8. The method of manufacturing the liquid cooling jacket according to claim 4 further comprising:

a provisional joining step of performing provisional joining on at least either of the first abutment portion and the second abutment portion, prior to the joining step.

* * * * *